(12) United States Patent
Zou et al.

(10) Patent No.: US 11,897,648 B2
(45) Date of Patent: Feb. 13, 2024

(54) ADAPTIVE QUANTITATIVE SUB-PACKAGING METHOD FOR FRIED RICE WITH MULTIPLE SIDE DISHES IN CENTRAL KITCHEN AND APPARATUS THEREFOR

(71) Applicant: Jiangsu University, Jiangsu (CN)

(72) Inventors: Xiaobo Zou, Jiangsu (CN); Chuang Li, Jiangsu (CN); Jiyong Shi, Jiangsu (CN); Xiaowei Huang, Jiangsu (CN); Zhihua Li, Jiangsu (CN); Tingting Shen, Jiangsu (CN); Xuetao Hu, Jiangsu (CN); Jiukai Zhang, Jiangsu (CN); Jianbo Xiao, Jiangsu (CN); Zhiming Guo, Jiangsu (CN)

(73) Assignee: Jiangsu University, Jiangsu (CN)

( * ) Notice: Subject to any disclaimer, the term of this patent is extended or adjusted under 35 U.S.C. 154(b) by 167 days.

(21) Appl. No.: 17/767,446

(22) PCT Filed: Dec. 3, 2021

(86) PCT No.: PCT/CN2021/135371
§ 371 (c)(1),
(2) Date: Apr. 8, 2022

(87) PCT Pub. No.: WO2023/097663
PCT Pub. Date: Jun. 8, 2023

(65) Prior Publication Data
US 2023/0331420 A1  Oct. 19, 2023

(30) Foreign Application Priority Data

Dec. 1, 2021  (CN) .......................... 202111455586.7

(51) Int. Cl.
*B65B 57/14*  (2006.01)
*B65B 25/00*  (2006.01)
*B65B 1/06*  (2006.01)
*B65B 1/32*  (2006.01)
*B65B 43/52*  (2006.01)

(52) U.S. Cl.
CPC .............. *B65B 57/145* (2013.01); *B65B 1/06* (2013.01); *B65B 1/32* (2013.01); *B65B 25/001* (2013.01); *B65B 43/52* (2013.01); *G06T 2207/30128* (2013.01)

(58) Field of Classification Search
CPC ........... B65B 1/32; B65B 25/00; B65B 57/00; B65B 25/001; G06V 20/20; G06F 16/9535
USPC ........... 53/473; 426/233, 523; 700/257, 245, 700/250
See application file for complete search history.

(56) References Cited

U.S. PATENT DOCUMENTS

2016/0059412 A1* 3/2016 Oleynik ................... B25J 19/02
                                                              700/250
2019/0290172 A1* 9/2019 Hadad .................. A61B 5/0022

FOREIGN PATENT DOCUMENTS

CN          113104265 A  *  7/2021  ............... B65B 1/32

* cited by examiner

*Primary Examiner* — Jacob A Smith
(74) *Attorney, Agent, or Firm* — JCIPRNET

(57) ABSTRACT

The present invention belongs to the technical field of food processing, and in particular, relates to an adaptive quantitative sub-packaging method for fried rice with multiple side dishes in a central kitchen and an apparatus therefor. The present invention mainly includes self-construction of a key side dish recognition model, self-evaluation of the key side dish recognition model, adaptive quantification of batch fried rice, and the apparatus matched with the three-step operation.

10 Claims, 5 Drawing Sheets

(a)

| 28 | 32 | 30 | 26 | 31 | 30 | 29 | 31 |
|----|----|----|----|----|----|----|----|
| 3  | 1  | 1  | 3  | 2  | 2  | 1  | 1  |
| 0  | 2  | 1  | 0  | 2  | 1  | 2  | 1  |

(b)

| 32 | 28 | 32 | 30 | 26 | 31 | 30 | 29 |
|----|----|----|----|----|----|----|----|
| 3  | 3  | 1  | 1  | 3  | 2  | 2  | 1  |
| 0  | 0  | 2  | 1  | 0  | 2  | 1  | 2  |

(c)

| 32 | 28 | 32 | 30 | 26 | 31 | 30 | 29 |
|----|----|----|----|----|----|----|----|
| 2  | 3  | 1  | 1  | 2  | 2  | 2  | 1  |
| 2  | 0  | 2  | 1  | 1  | 2  | 1  | 2  |

FIG. 5

ADAPTIVE QUANTITATIVE SUB-PACKAGING METHOD FOR FRIED RICE WITH MULTIPLE SIDE DISHES IN CENTRAL KITCHEN AND APPARATUS THEREFOR

CROSS-REFERENCE TO RELATED APPLICATION

This application is a 371 of international application of PCT application serial no. PCT/CN2021/135371, filed on Dec. 3, 2021, which claims the priority benefit of China application no. 202111455586.7, filed on Dec. 1, 2021. The entirety of each of the above-mentioned patent applications is hereby incorporated by reference herein and made a part of this specification.

TECHNICAL FIELD

The present invention belongs to the technical field of food processing, and in particular, relates to an adaptive quantitative sub-packaging method for fried rice with multiple side dishes in a central kitchen, and an apparatus therefor.

DESCRIPTION OF RELATED ART

Fried rice is a kind of traditional food cooked by mixing rice, side dishes, and seasonings, has the characteristics of perfect combination of color aroma taste and appearance, and is deeply loved by consumers all over the world. Due to different types of rice, seasonings, and cooking methods, fried rice with unique regional characteristics or specific flavors is formed in different countries and regions, such as Yangzhou fried rice, Spanish paella, fried rice with soy sauce, egg fried rice, and curry fried rice. Most of the rice and side dishes used for the fried rice are granular ingredients, which ensures that the whole fried rice is evenly tasted and matured simultaneously, gives the finished fried rice distinct particles, and makes the fried rice in ever-changing combinations at the same time, thereby greatly enriching the types and tastes of the fried rice.

In order to overcome the problems of low efficiency, large differences in flavor, and difficulty in ensuring safety and hygiene of artificial fried rice, a central kitchen production mode featuring standardization, batch production, and continuity is being closely integrated with fried rice production. The resulting central kitchen fried rice technology, equipment, and enterprises are changing the pattern of fried rice production and supply. However, the existing sub-packaging of the fried rice in the central kitchen still follows the traditional weight sub-packaging method, making sub-packaging a link that needs to be further strengthened in the current production of the fried rice in the central kitchen. When the ingredients to be sub-packaged are relatively uniform as a whole or the content of components of different particles is relatively consistent, the weight-based sub-packaging method can ensure that the difference between the sub-packaged products is small, such as the filling of liquid beverages and the sub-packaging of biscuits. However, the fried rice is a kind of food with extremely rich side dishes, and even some of the side dishes are the key to the characteristics and flavor of the fried rice. However, the traditional weight sub-packaging method cannot guarantee that each product contains the same content of specific side dishes after sub-packaging, and the uneven sub-packaging of products necessarily leads to fluctuations in product quality, which affects the rights and interests of consumers. It can be seen that the sub-packaging of the fried rice not only requires the total weight of each product after sub-packaging to be the same, but also should ensure that the weight of specific side dishes in each product is as consistent as possible.

In the process of weighing and quantifying, identifying, locating, and quantifying specific side dishes simultaneously is the key to accurate sub-packaging of the fried rice. At present, there are roughly two categories of methods that may meet the above requirements: an artificial vision quantitative sub-packaging method and a computer vision quantitative sub-packaging method. A main process of the artificial vision quantitative sub-packaging method is that workers use the naked eye to identify specific side dishes in the fried rice and estimate and adjust their weight in the process of weighing and quantifying. The advantages of this method include high recognition of side dishes and good flexibility. The disadvantages are that artificial vision is easily subjected to fatigue, and it is difficult to seamlessly connect with a mechanical sub-packaging mechanism, resulting in slow quantitative speed and low efficiency, and this method cannot match the batch production mode of the central kitchen. A main process of the computer vision quantitative sub-packaging method is to use the combination of a computer, a camera, and an image processing program to identify and quantify specific side dishes in the fried rice. The advantages of this method are that the recognition speed is fast, the recognition results can be seamlessly connected with the mechanical sub-packaging mechanism, and can match the batch and continuous production mode of the central kitchen. However, the disadvantages of the computer vision quantitative sub-packaging method are that its image processing program is often developed for relatively fixed recognition objects. When the color of the recognized side dishes changes due to the adjustment of frying process or the background of the recognized side dishes changes due to the adjustment of the formula of the fried rice, the entire production line of the fried rice in the central kitchen needs to be stopped, and the entire production line can only be restarted after the image processing program is modified by professionals, resulting in inevitable economic losses.

In order to overcome the deficiencies of the prior art solutions, the present invention provides an adaptive quantitative sub-packaging method for fried rice with multiple side dishes in a central kitchen and an apparatus for the adaptive quantitative sub-packaging method, such that the quantitative sub-packaging equipment and method for fried rice can actively adapt to the characteristics and changes of the fried rice to be sub-packaged, and improve the automation and intelligence level of fried rice production in the central kitchen.

SUMMARY

An objective of the present invention is to provide an adaptive quantitative sub-packaging method for fried rice with multiple side dishes in a central kitchen and an apparatus therefor, which is used to solve the problem that the computer vision technology can only recognize side dishes of fried rice in a fixed scene and cannot adjust adaptively when the scene changes, and the problem of fluctuations in product quality caused by uneven sub-packaging of specific side dishes in fried rice in the prior art.

First, the present invention provides an adaptive quantitative sub-packaging method for fried rice with multiple side dishes in a central kitchen, including three steps of self-construction of a key side dish recognition model, self-evaluation of the key side dish recognition model, and adaptive quantification of batch fried rice sub-packaging.

Step I, self-construction of a key side dish recognition model includes the following processes:

process I, for fried rice with a standard formula including rice, edible oil, m kinds of side dishes, and n kinds of seasoning liquids, obtaining finished fried rice to be sub-packaged by frying with a standardized process and fixed equipment of the central kitchen, and selecting an i-th side dish H_i of the finished fried rice to be sub-packaged as a key side dish required for quantification;

process II, taking m1 kg of the finished fried rice to be sub-packaged as a fried rice sample A for model construction, and separating the key side dish H_i in the fried rice sample A for model construction from other fried rice ingredients to obtain a fried rice sample A&H_i containing only the key side dish H_i, and a fried rice sample A-H_i without the key side dish H_i;

process III, starting a central control module matched with this method, where the central control module includes a model self-construction module, a model self-evaluation module, and an adaptive quantitative module for the fried rice, and the model self-construction module, the model self-evaluation module, and the adaptive quantitative module for the fried rice are electrically connected, and the model self-construction module includes a material box self-resetting module and a startup model self-construction module, the model self-evaluation module includes a material box self-resetting module and a startup model self-evaluation module, and the adaptive quantitative module for the fried rice includes an adaptive quantitative operation module;

first, starting the material box self-resetting module in the model self-construction module in the central control module, transmitting, by the material box self-resetting module, a signal to the central control module, so as to control movement of a position sensor and a main conveyor belt, and resetting a material box on the main conveyor belt to completely coincide with a predefined station; and then laying the fried rice sample A&H_i in a single-layer and non-overlapping manner in w material boxes in other stations before an imaging station, and laying the fried rice sample A-H_i in a single-layer and non-overlapping manner in w material boxes in stations before the imaging station to obtain w material boxes containing only thin layers of the fried rice sample A&H_i and w material boxes containing only thin layers of the fried rice sample A-H_i, where w is a positive integer;

process IV, inputting, to the model self-construction module, a product name of the fried rice to be sub-packaged X1, a name of the key side dish X2, a station number corresponding to the material boxes containing the thin layers of the fried rice sample A&H_i and a number of the key side dishes H_i contained in each of the material boxes, and relevant information of a station number corresponding to the material boxes containing the thin layers of the fried rice sample A-H_i; and clicking the startup model self-construction module in a boundary of the model self-construction module, transmitting a signal to the central control module to control a camera to self-acquire the fried rice samples A&H_i and A-H_i and images I_A&H_i_h_j, I_A-H_i_h_j, and I_O_h_j of w empty material boxes illuminated by b light sources with different bands $\lambda 1$, $\lambda 2, \ldots, \lambda(b-1)$, and kb, self-optimizing, by the central control module, an optimal band $\lambda\_A$ and an optimal segmentation threshold C for key side dish recognition, and self-calculating and displaying an optimal recognition rate for modeling of D, where $h \in [1, b]$, $j \in [1, w]$, and h and b are positive integers; and process V, when the model recognition rate D is greater than or equal to an expected recognition rate E, proceeding to step II of an operation of "self-evaluation of the key side dish recognition model"; and when the model recognition rate D is less than the expected recognition rate E, repeating the processes II, III, IV, and V of the step I.

Preferably, the expected recognition rate E in the step I is 95-100%.

Preferably, a method for predefining the station in the step I includes: starting the main conveyor belt for 1-60 s of operation, and then cutting off a power supply of a drive motor of the main conveyor belt, such that a certain material box on the surface of the main conveyor belt is directly below the imaging system camera, and setting a position of the main conveyor belt at this time as a trigger position of the position sensor; sequentially numbering positions of the material boxes on the surface of the main conveyor belt from 1 in a movement direction of the main conveyor belt (that is, starting from a loading material box below an unloading port of the hopper and ending with the unloading material box at an end of the main conveyor belt), where each of the material boxes corresponds to a station, such that positions of the stations on the main conveyor belt and corresponding numbers of the positions are obtained, and a No. 1 station below the unloading port of the hopper is defined as a loading station, a station directly under the camera is defined as the imaging station, and the unloading station at the end of the main conveyor belt is defined as the unloading station; and after the setting of the trigger position of the position sensor is completed, when each of the material boxes passes directly below the camera, triggering once, by a position trigger, in real time and sending a trigger signal once to the central control module.

Preferably, the images I_A&H_i_h_j, I_A-H_i_h_j, and I_O_h_j in the step I have pixel gray values in a range of [0 255].

Preferably, a method for self-optimizing the optimal band $\lambda\_A$ and the optimal segmentation threshold C for key side dish recognition in the step I includes: for images I_A&H_i_h_j of w fried rice samples A&H_i, images I_A-H_i_h_j of w fried rice samples A-H_i, and images I_O_h_j of w empty material boxes under a $\lambda h$ light source of an h-th band, generating a histogram of the images I_A&H_i_h_j respectively to obtain a peak gray value K_h_j corresponding to a peak value of the histogram, and calculating an average value K_h_mean of w peak gray values K_h_j; according to a downlink optimization step $\Delta K\_h-$ and an uplink optimization step $\Delta K\_h+$ of an h-th band segmentation threshold, determining p downlink optimization thresholds $(K\_h\_mean)-c^*\Delta K\_h-$ of the segmentation threshold in a downlink optimization direction and q uplink optimization thresholds $(K\_h\_mean)+d^*\Delta K\_h+$ in an uplink optimization direction; obtaining $p^*q$ combined optimization thresholds $C\_\lambda h\_c\_d=((K\_h\_mean)-c^*\Delta K\_h-, (K\_h\_mean)+d^*\Delta K\_h+)$ by taking any one downlink optimization threshold and any one uplink optimization threshold, where $(K\_h\_mean)-c^*\Delta K\_h-$ is used as a lower threshold for image processing, and $(K\_h\_mean)+d^*\Delta K\_h+$ is used as an upper threshold for image processing; and sequentially processing, by the central control module, the images I_A&H_i_h_j of w fried rice samples A&H_i, the images I_A-H_i_h_j of w fried rice samples A-H_i, and the images I_O_h_j of the w empty material boxes according to the optimization threshold C_λh_c_d to obtain the recognition number of the key side dishes corresponding to each of the material boxes, comparing the recognition number of the key side dishes corresponding to each of the material boxes with the input number of the key side dishes corresponding to each of the material boxes, and calculating a corresponding modeling recognition rate D_λh_c_d; and calculating the corresponding modeling recognition rate D_λh_c_d sequentially by taking the value of h as 1, 2, . . . , b−1, and b sequentially; and according to a corresponding h value, c value, and d value when a maximum modeling recognition rate D_λh_c_d is obtained, determining the optimal band to be λ_A=λh, the optimal segmentation threshold to be C=C λh_c_d, and the optimal recognition rate for modeling to be D=D_λh_c_d, where c∈[1, p], d∈[1, q], and c, d, p, and q are positive integers.

Preferably, a method for determining the downlink optimization step ΔK_h− and the uplink optimization step ΔK_h+ includes: obtaining, by the central control module, a number of optimization thresholds for a downlink optimization method p=Int(L*Rand(0, 1)) and q=Int(L*Rand(0, 1)) according to a number L of maximum unidirectional thresholds by means of a random number production function Rand(0, 1) and a rounding function Int with a value range in [0 1], and calculating the downlink optimization step ΔK_h−=Int((K_h_mean)/p) and the uplink optimization step ΔK_h+=Int((255−(K_h_mean))/q) accordingly.

Step II, self-evaluation of the key side dish recognition model includes the following processes:

process i, taking m2 kg of the finished fried rice as a fried rice sample B for model construction, and separating the key side dish H_i in 2*(m2)/3 kg of the fried rice sample B from other fried rice ingredients to obtain a fried rice sample B&H_i containing only a key side dish H_i, a fried rice sample B-H_i without a key side dish H_i, and (m2)/3 kg of a fried rice sample B_B containing all ingredients;

process ii, starting the material box self-resetting module in the model self-evaluation module in the central control module, and transmitting, by the material box self-resetting module, a signal to the central control module to control the position sensor to reset the material box on the main conveyor belt to completely coincide with the predefined station after one cycle of operation; and then laying, by workers, the fried rice sample B_B in a single-layer and non-overlapping manner in w material boxes in the stations before the imaging station, laying the fried rice sample B-H_i in a single-layer and non-overlapping manner in w material boxes in the stations before the imaging station, and laying the fried rice sample B&H_i in a single-layer and non-overlapping manner in w material boxes in the stations before the imaging station to obtain w material boxes containing only thin layers of the fried rice sample B_B, w material boxes containing only thin layers of the fried rice sample B-H_i, and w material boxes containing only thin layers of the fried rice sample B&H_i, where preferably, in the step II, the main conveyor belt is elliptical, and one circle of operation from a certain starting position back to an origin is recorded as one cycle;

process iii, inputting, to the model self-evaluation module in the central control module, a station number of the material boxes containing the thin layers of the fried rice sample B_B and a number of the key side dishes H_i contained in each of the material boxes, a station number of the material boxes containing the thin layers of the fried rice sample B-H_i, a station number of the material boxes containing the thin layers of the fried rice sample B&H_i, and relevant information of a number of the key side dishes H_i contained in each of the material boxes;

process iv, clicking the startup model self-evaluation module in the model self-evaluation module in the central control module, transmitting, by the startup model self-evaluation module, a signal to the central control module to open a light source corresponding to the optimal band λ_A through the central control module according to the optimal band λ_A and the optimal segmentation threshold C obtained in the step I, and acquiring, by the camera, an image I_B_B_j of w fried rice samples B_B, an image I_B-H_i_j of w fried rice samples B-H_i, and an image I_B&H_i_j of w fried rice samples B&H_i illuminated by the light source corresponding to λ_A; and sequentially recognizing, by the central control module, numbers of the key side dishes H_i in the images I_B_B_j, I_B-H_i_j, and I_B&H_i_j according to the optimal segmentation threshold C, and comparing recognition results with numbers of the key side dishes H_i input by the workers to calculate an evaluation recognition rate F; and process v, when the evaluation recognition rate F is greater than or equal to an expected recognition rate G, automatically saving, by control software, the optimal band λ_A and the optimal segmentation threshold C and proceeding to step III of adaptive quantification of the fried rice; and when the model recognition rate F is less than the expected recognition rate G, repeating all the processes of the step I.

Preferably, the expected recognition rate G is 95-100%.

Step III, adaptive quantification of batch fried rice sub-packaging includes the following processes:

process 1, starting batch production to obtain the finished fried rice to be sub-packaged according to the standard formula, standard process, and equipment of the process I in the step I, and inputting information of a number I of the key side dishes of a single portion of fried rice and a total weight L of a single portion of fried rice into the adaptive quantitative module for the fried rice in the central control module; and clicking the "adaptive quantitative operation" module in the adaptive quantitative module for the fried rice, and transmitting, by the "adaptive quantitative operation" module, a signal to the central control module, so as to control a quantitative device to start adaptive quantitative sub-packaging of the finished fried rice to be sub-packaged in a hopper;

process 2, after the quantitative sub-packaging starts, enabling the finished fried rice to be sub-packaged in the hopper to fall into the material box on the station corresponding to a surface of the main conveyor belt in a uniform movement state in the form of a single-layer waterfall, enabling rice in a single-layer thin-layer state in the material box to pass below the camera with the material box as a basic unit, sensing, by the central control module, a movement behavior of the material box on each station through the position sensor, and shooting, by the camera, image information of the finished fried rice in the material box corresponding to the imaging station under the optimal band $\lambda\_A$ every time the material box moves one station;

process 3, quickly recognizing by the central control module, the product rice in the material box below the camera by using the segmentation threshold C determined in the step I to obtain a number $J\_c$ of the key side dishes $H\_i$, so as to obtain numbers $J-1$, $J-2, \ldots, J-(f-1)$, and $J-f$ of the key side dishes $H\_i$ corresponding to the fried rice in the material boxes on f stations to be sub-packaged between the imaging station and an unloading station; loading, by the central control module, the fried rice into the same packaging container by taking the fried rice in 2 material boxes as a group according to the numbers $J-1, J-2, \ldots, J-(f-1)$, and $J-f$ of the key side dishes in the material box on the f sub-packaging stations to obtain a number $I\pm\Delta g$ of the key side dishes of a single portion of fried rice as a target, determining an optimal matching combination of the key side dishes in any 2 groups of material boxes in all material boxes in an adaptive manner, and recording matching results in an array M; and every time the central control module senses through the position sensor that the material box moves one station, recognizing, by the central control module, the number $J\_c$ of the key side dishes newly entering the material box on the imaging station, displaying $J\_c$ in a text box corresponding to "Number of key side dishes $H\_i$ on imaging station" in an interface of "Adaptive quantitative module for fried rice", and updating the array M recording the matching results accordingly, where a method for constructing and defining the array M recording the matching results includes: establishing the array M with 3 rows, f+2 columns, and an initial value of 0 for matching of pairwise combinations of the material boxes, where a 1st column to a (f+2)-th column of the array sequentially corresponds to the imaging station 303 on the sub-packaging equipment, and the f stations to be sub-packaged, and the unloading station for the fried rice, a 1st row of the array M is used to store a number of particles of key side dishes in the material boxes on the stations corresponding to the column of the array, a 2nd row of the array M is used to record and store a falling path of the fried rice in the material boxes on the stations corresponding to the column of the array, a value of a certain column in the 2nd row being 0 indicates that there is no fried rice in the material boxes on the stations corresponding to this column, a value of a certain column in the 2nd row being 1 indicates that the fried rice in the material boxes on the stations corresponding to this column enters a falling path 1, a value of a certain column in the 2nd row being 2 indicates that the fried rice in the material boxes on the stations corresponding to this column enters a falling path 2, a value of a certain column in the 2nd row being 3 indicates that the fried rice in the material boxes on the stations corresponding to this column enters a falling path 3, a 3rd row of the array M is used to store a matching situation of the material boxes on the stations corresponding to the column of the array, matching is performed from the last column of the 3rd row to the first column, values of two certain columns in 3 rows being 1 and 2 respectively and values in the 2nd row of these two columns being both 1 or 2 at the same time indicate that the fried rice in the material boxes on the stations corresponding to these two columns is capable of being matched to one packaging container, and a value of a certain column in 3 rows being 0 indicates that the material boxes on the stations corresponding to this column have not been successfully matched, preferably, the station to be sub-packaged in the step III is a station between the imaging station and the unloading station, and a method for updating the array M recording the matching results includes: when the central control module obtains the number $J\_c$ of the key side dishes newly entering the material box on the imaging station, starting to update the array M; first, assigning values of the 2nd row and the 3rd row of the (f+2)-th column of the array M to primary quantitative control parameters $P1=M(2, f+2)$ and $P2=M(3, f+2)$; second, moving a value of the array M back by 1 column as a whole through $M(:, (f+3)-k)=M(:, (f+2)-k)$, where values of k are $2, 3, \ldots, f+1$, and $f+2$ sequentially; saving the number $J\_c$ of the key side dishes newly entering the material box on the imaging station into the array, such that $M(1, 1)=J\_c$; when $J\_c=0$, setting $M(2, 1)=M(3, 1)=0$; finally, when $J\_c\neq 0$, setting the values of k as $f+2, f+1, \ldots, 3$, and 2 sequentially, and calculating $M(1, k)+M(1, 1)$ when $M(2, k)=3$; if the value of k meets $I-\Delta g \leq M(1, k)+M(1, 1) \leq I+\Delta g$ and $M(2, 2:k)\neq 3$-Temp, $M(2, k)=M(2, 1)=3$-Temp, $M(3, k)=1$, $M(3, 1)=2$, and Temp=$M(2, 1)$, ending update of the array M; and if there is no value of k meeting $I-\Delta g \leq M(1, k)+M(1, 1) \leq I+\Delta g$ and $M(2, 2:k)\neq 3$-Temp, $M(2, 1)=3$, and $M(3, 1)=0$, ending update of the array M;

process 4, while the array M is being updated, controlling, by the central control module, opening and closing of a No. 1 material guide plate and a No. 2 material guide plate according to the primary quantitative control parameters P1 and P2, so as to control a falling track of the fried rice on a slideway, thereby ensuring that the fried rice in the combined material box accurately falls into the packaging container corresponding to a first primary quantitative station or a second primary quantitative station; and process 5, in order to ensure that the total weight of the fried rice in the packaging container of the first primary quantitative station or the second primary quantitative station is consistent with the set total weight L of a single portion of fried rice, conveying the fried rice in the packaging container of the first primary quantitative station or the second primary quantitative station to a secondary quantitative station along with the packaging container, and guiding, by the central control module, counterweight fried rice of a specific weight to fall into a packaging container on the secondary quantitative station according to a weight of the fried rice in the packaging container on the secondary quantitative station, such that the total weight of the fried rice in each packaging container after passing through the secondary quantitative station is the same, and the number of the key side dishes in each packaging container is also the same; and then, when the position sensor senses that the next material box enters the imaging station, repeating the process 2, process 3, process 4, and process 5 of the step III, where an initial value of a global variable Temp is 2.

Preferably, a method for ensuring that the fried rice in the combined material box accurately falls into the primary quantitative station includes: since when P1=1 and P2=1, the fried rice enters the falling path 1, controlling, by the central control module, the No. 1 material guide plate on a main unloading slideway to be opened upward, and the No. 2 material guide plate to be closed, so as to guide the fried rice in the material box on the unloading station to fall into the packaging container corresponding to the first primary quantitative station; since when P1=1 and P2=2, the fried rice enters the falling path 1, controlling the No. 1 material guide plate on the main unloading slideway to be opened upward, and the No. 2 material guide plate to be closed, so as to guide the fried rice in the material box on the unloading station to fall into the packaging container corresponding to the first primary quantitative station, and controlling a primary quantitative main conveyor belt to convey the packaging container and the fried rice inside the packaging container to the secondary quantitative station, and controlling a packaging container loading mechanism to convey an empty packaging container to the first primary quantitative station at the same time; since when P1=2 and P2=1, the fried rice enters the falling path 2, controlling the No. 1 material guide plate on the main unloading slideway to be closed, and the No. 2 material guide plate to be opened upward, so as to guide the fried rice in the material box on the unloading station to fall into the packaging container corresponding to the second primary quantitative station; since when P1=2 and P2=2, the fried rice enters the falling path 2, controlling the No. 1 material guide plate on the main unloading slideway to be closed, and the No. 2 material guide plate to be opened upward, so as to guide the fried rice in the material box on the unloading station to fall into the packaging container corresponding to the second primary quantitative station, and controlling the primary quantitative main conveyor belt to convey the packaging container and the fried rice inside the packaging container to the secondary quantitative station, and controlling the packaging container loading mechanism to convey an empty packaging container to the second primary quantitative station at the same time; since when P1=3, the fried rice enters the falling path 3, controlling the No. 1 material guide plate and the No. 2 material guide plate on the main unloading slideway to both be closed, so as to guide the fried rice in the material box on the unloading station to fall into the return hopper through the main unloading slideway; and since when P1=0, there is no fried rice in the material box on the unloading station, controlling the No. 1 material guide plate and the No. 2 material guide plate on the main unloading slideway to both be closed, where the fried rice in a return hopper is conveyed to the hopper by air flow through a return tube.

Preferably, a method for guiding the counterweight fried rice of a specific weight to fall into the packaging container on the secondary quantitative station in the step III includes: sensing, by an electronic scale below the secondary quantitative station, a total weight M1 of the packaging container above the scale and the fried rice inside in real time, and starting, by the central control module, a secondary quantitative feeding device to work, where when L−M1>0, the counterweight fried rice with a weight of L−M1 is conveyed into the packaging container, such that the total weight of the secondary quantitative packaging container and the rice inside the secondary quantitative packaging container is equal to a set value L; when L−M1=0, the total weight of the fried rice in the packaging container is equal to the set value L, and no counterweight is required; when L−M1<0, the total weight of the fried rice in the packaging container has exceeded the set value L, and the fried rice is treated as overweight; and the counterweight fried rice may not contain the key side dish H_i, and the rest of the formula, technology, and equipment may be all identical to the finished fried rice to be sub-packaged in the process I of the step I; and in the case where the central control module has saved the optimal band $\lambda\_A$ corresponding to the fried rice to be sub-packaged and the optimal segmentation threshold C, skipping, by the control software, the steps I and II, directly calling the saved optimal band $\lambda\_A$ and the optimal segmentation threshold C, and performing the step III; and if the control software is in capable of calling the optimal band $\lambda\_A$ corresponding to the fried rice to be sub-packaged and the optimal segmentation threshold C, performing the step I, step II, and step III sequentially.

Secondly, the present invention provides an apparatus matched with the adaptive quantitative sub-packaging method for the fried rice with the multiple side dishes in the central kitchen, including a fried rice loading device, a fried rice conveying device, a side dish recognition device, a primary quantitative device, a secondary quantitative device, a return device, and the central control module.

A main structure includes the hopper, an electronically controlled discharger, a first vibrator, a second vibrator, a loading guide plate, the loading station, the unloading station, the material box, a drive chain, the drive motor, the position sensor, the main conveyor belt, the camera, the light source, the imaging station, the central control module, a computer, the main unloading slideway, the No. 1 material guide plate, a No. 1 auxiliary slideway, the first primary quantitative station, the No. 2 material guide plate, a No. 2 auxiliary slideway, the second primary quantitative station, the packaging container loading mechanism, the primary quantitative conveyor belt, a secondary quantitative conveyor belt, the secondary quantitative station, a counterweight fried rice hopper, a counterweight electronically controlled discharger, the electronic scale, a third vibrator, the return hopper, and the return tube.

The fried rice loading device is composed of the hopper, the electronically controlled discharger, the first vibrator, the second vibrator, and the loading guide plate, the electronically controlled discharger is located at the bottom of a discharge port of the hopper and is connected to the first vibrator. The loading guide plate is located below the electronically controlled discharger, and is connected to the second vibrator. A lower part of the loading guide plate is connected to the material box. The electronically controlled discharger, the first vibrator, and the second vibrator are all electrically connected to the central control module.

The fried rice conveying device is composed of the material box, the drive chain, the drive motor, the position sensor, and the main conveyor belt, and a plurality of the material boxes are arranged, and are fixed on the main conveyor belt at equal intervals. The position sensors are arranged on both sides of the main conveyor belt to sense and control a moving distance and the corresponding position of the material boxes. The position sensor and the drive motor are electrically connected to the central control module.

The side dish recognition device includes the camera and the light source, the camera and the light source are arranged above the imaging station. The imaging station is arranged above the main conveyor belt. The light source is composed of light sources capable of emitting light of multiple different bands, and the light of a specific band is capable of being individually emitted under the control of the central control module. The camera and the light source are both electrically connected to the central control module. After receiving a trigger signal through the central control module, the camera and the light source are controlled to turn on, and an image of fried rice inside the material box corresponding to the imaging station is obtained.

The primary quantitative device includes the main unloading slideway for the fried rice, the No. 1 material guide plate, the No. 1 auxiliary slideway, the first primary quantitative station, the No. 2 material guide plate, the No. 2 auxiliary slideway, the second primary quantitative station, the packaging container loading mechanism, and the primary quantitative conveyor belt. The unloading station is arranged at an end of the main conveyor belt, and an opening of the main unloading slideway is located below the unloading station, such that the fried rice inside the material box falls to an entrance of the main unloading slideway with gravity after the material box reaches the unloading station.

A lower part of the main unloading slideway is sequentially communicated to the No. 1 auxiliary slideway and the No. 2 auxiliary slideway. The No. 1 material guide plate is arranged at a communication place of the main unloading slideway and the No. 1 auxiliary slideway. The No. 2 material guide plate is arranged at a communication place of the main unloading slideway and the No. 2 auxiliary slideway. The first primary quantitative station is connected to a lower exit of the No. 1 auxiliary slideway. The second primary quantitative station is connected to a lower exit of the No. 2 auxiliary slideway.

The No. 1 material guide plate and the No. 2 material guide plate are used to close and open entrances of the auxiliary slideways, that is, the communication places of the auxiliary slideways and the main unloading slideway; and the return hopper is arranged at an end outlet of the main unloading slideway.

The No. 1 material guide plate, the No. 2 material guide plate, the packaging container loading mechanism, and the primary quantitative conveyor belt are all electrically connected to the central control module.

The primary quantitative conveyor belt is arranged below the first primary quantitative station and the second primary quantitative station. The primary quantitative conveyor belt is electrically connected to the central control module.

The primary quantitative conveyor belt is capable of conveying the packaging container with completion of primary quantitative fried rice to the secondary quantitative device under the control of the central control module.

The secondary quantitative device includes the secondary quantitative conveyor belt, the secondary quantitative station, the counterweight fried rice hopper, the counterweight electronically controlled discharger, the electronic scale, and the third vibrator. The secondary quantitative conveyor belt is connected to the primary quantitative conveyor belt, and is capable of conveying the packaging container under the control of the central control module. The secondary quantitative station is arranged below an outlet of the counterweight electronically controlled discharger, and the electronic scale is arranged below the secondary quantitative station.

The secondary quantitative conveyor belt, the counterweight electronically controlled discharger, and the electronic scale are all connected to the central control module through a data cable.

The central control module includes a programmable controller and a power supply, and is electrically connected to the computer.

Preferably, the loading guide plate has an inclination angle of 30° to 60°.

Preferably, the main unloading slideway is inclined, and may have an inner wall surface made of a smooth material capable of making the fried rice slide freely.

The present invention has the following beneficial effects:

According to the quantitative method for fried rice and an apparatus for the quantitative method provided by the present invention, through the self-construction of the key side dish recognition model and the self-evaluation of the model effect, the equipment can recognize the untrained fried rice samples and the key side dishes therein through simple setting, such that the equipment is highly adaptive to unknown fried rice products produced in standardization. In addition, for the fried rice after quantification, the present invention can not only ensure that a total weight of each fried rice is consistent, but also can accurately ensure that the number of target configurations in each fried rice is consistent, and can effectively improve the automation and intelligence level of fried rice production in the central kitchen while guaranteeing the quantitative accuracy of the fried rice in the central kitchen.

BRIEF DESCRIPTION OF THE DRAWINGS

FIG. 5 is a flow chart of updating values of an array M of Embodiment 1 of the present invention.

Figure 1:
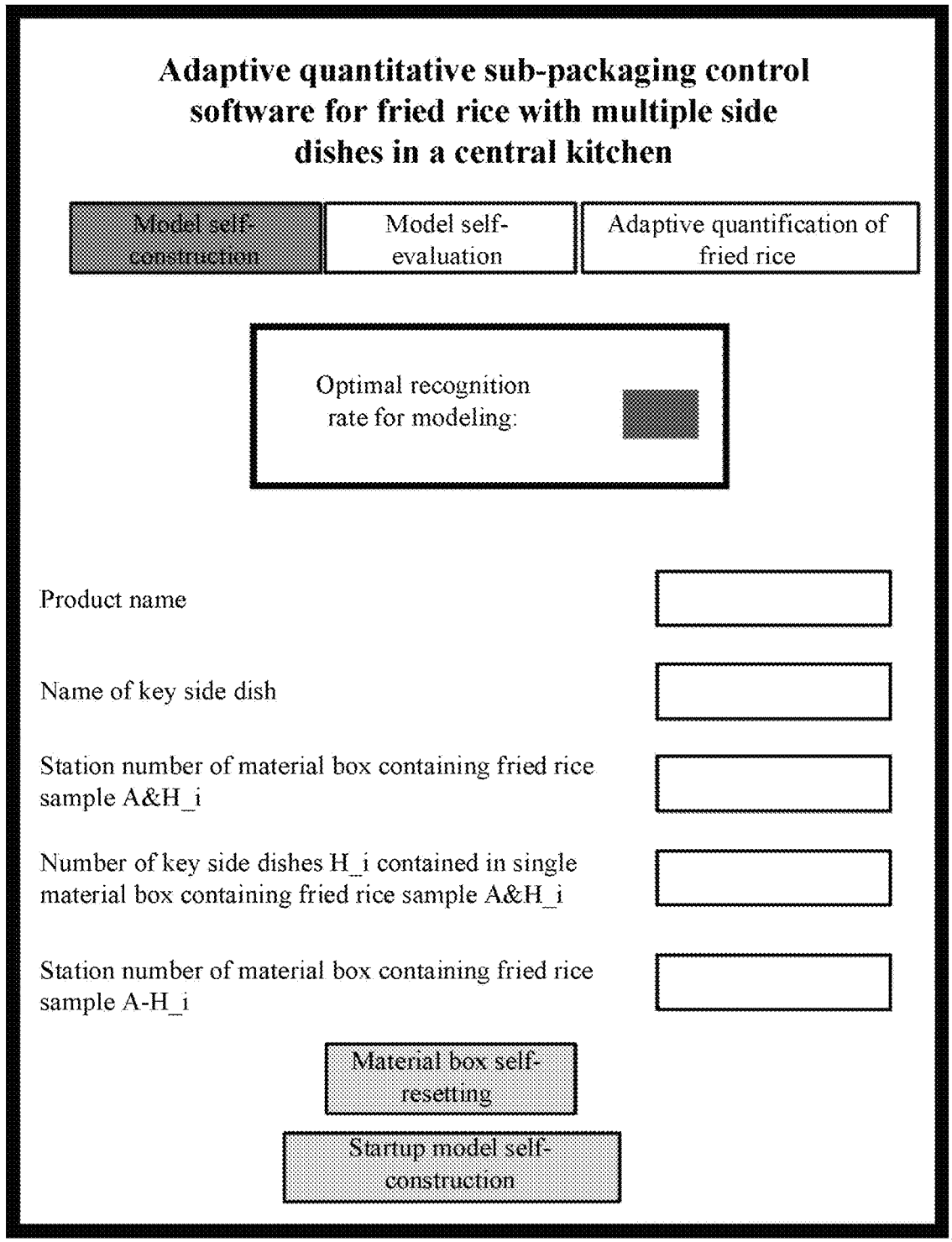
FIG. 1 is a schematic diagram of a model self-construction interface of adaptive quantitative sub-packaging control software for fried rice with multiple side dishes in a central kitchen of Embodiment 1 of the present invention.

In the drawings, 101. hopper; 102. electronically controlled discharger; 103. first vibrator; 104. second vibrator; 105. loading guide plate; 106. loading station; 107. unloading station; 201. material box; 202. drive chain; 203. drive motor; 204. position sensor; 205. main conveyor belt; 301. camera; 302. light source; 303. imaging station; 304. central control module; 305. computer; 401. main unloading slideway; 402. No. 1 material guide plate; 403. No. 1 auxiliary slideway; 404. first primary quantitative station; 405. No. 2 material guide plate; 406. No. 2 auxiliary slideway; 407. second primary quantitative station; 408. packaging container loading mechanism; 409. primary quantitative conveyor belt; 501. secondary quantitative conveyor belt; 502. secondary quantitative station; 503. counterweight fried rice hopper; 504. counterweight electronically controlled discharger; 505. electronic scale; 506. third vibrator; 601. return hopper; and 602. return tube.

DESCRIPTION OF THE EMBODIMENTS

To make the to-be-resolved technical problems, technical solutions and beneficial effects of the present invention clearer, the present invention is described in further detail below with reference to the drawings and embodiments. It should be understood that the embodiments described herein are merely used to explain the present invention, rather than to limit the present invention.

Embodiment 1

The present embodiment provides an adaptive quantitative sub-packaging method for fried rice with multiple side dishes in a central kitchen, including three steps of self-construction of a key side dish recognition model, self-evaluation of the key side dish recognition model, and adaptive quantification of batch fried rice sub-packaging.

Step I, self-construction of a key side dish recognition model includes the following processes.

Process I, when m=3, n=3, and i=1, for fried rice with a standard formula including rice, edible oil, 3 kinds of side dishes (diced ham sausage $H\_1$, diced carrot $H\_2$, and shredded green pepper $H\_3$), and 3 kinds of seasoning liquids (light soy sauce, oil consumption, and garlic juice), finished fried rice to be sub-packaged is obtained by frying with a standardized process and fixed equipment of the central kitchen, and a 1st side dish, the diced ham sausage $H\_1$, of the fried rice to be sub-packaged is selected as a key side dish required for quantification.

Process II, when m1=2, workers take 2 kg of the finished fried rice to be sub-packaged as a fried rice sample A for model construction, and pick out all the diced ham sausage $H\_1$ in the sample for model construction to obtain a fried rice sample A&$H\_1$ containing only the diced ham sausage $H\_1$, and a fried rice sample A-$H\_1$ without the diced ham sausage $H\_1$.

Process III, when w=2 (that is, the sample accounts for 2 material boxes), a central control module 304 matched with this method is started. The central control module 304 includes a model self-construction module, a model self-evaluation module, and an adaptive quantitative module for the fried rice, and the model self-construction module, the model self-evaluation module, and the adaptive quantitative module for the fried rice are electrically connected. The central control module 304 is electrically connected to the computer 305.

The model self-construction module includes a material box self-resetting module and a startup model self-construction module.

The model self-evaluation module includes a material box self-resetting module and a startup model self-evaluation module.

The adaptive quantitative module for the fried rice includes an adaptive quantitative operation module.

Parameter settings corresponding to the model self-construction module include a product name, a name of key side dishes, a station number of a material box containing a fried rice sample A&$H\_i$, a number of key side dishes $H\_i$ contained in a single material box containing the fried rice sample A&$H\_i$, and a station number of a material box containing a fried rice sample A-$H\_i$, which all are displayed on a display screen of the computer 305.

Parameter settings corresponding to the model self-evaluation module include a station number of a material box containing a fried rice sample $B\_B$, a number of key side dishes $H\_i$ contained in a single material box containing the fried rice sample $B\_B$, a station number of a material box containing a fried rice sample B-$H\_i$, a station number of a material box containing a fried rice sample B&$H\_i$, and a number of key side dishes $H\_i$ contained in a single material box containing the fried rice sample B&$H\_i$, which all are displayed on the display screen of the computer 305.

Parameter settings corresponding to the adaptive quantitative module for the fried rice include a number of key side dishes $H\_i$ on an imaging station, a number of key side dishes of a single portion of fried rice, and a total weight of a single portion of fried rice, which all are displayed on the display screen of the computer 305.

Figure 4:
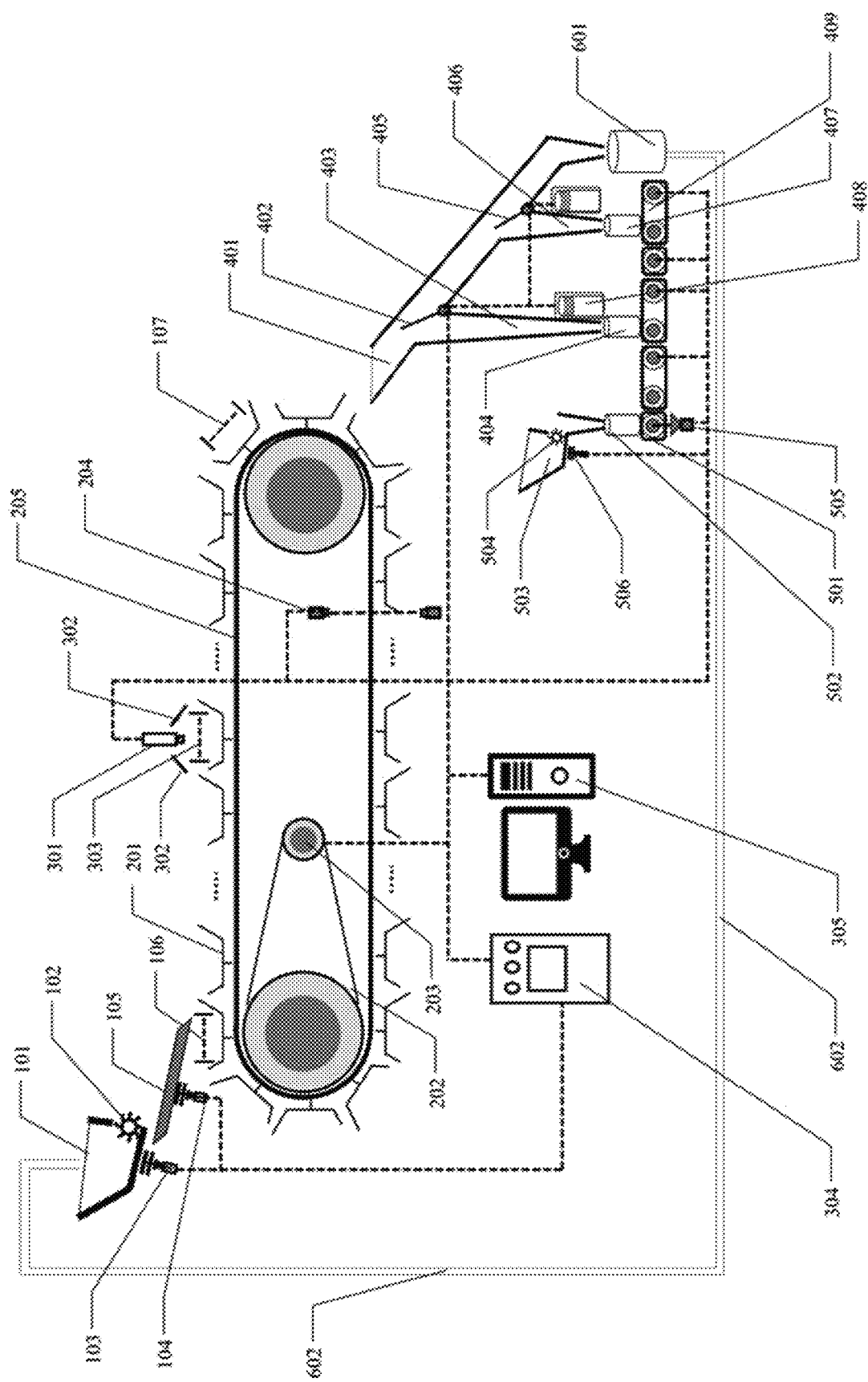
FIG. 4 is a schematic structural diagram of an adaptive quantitative sub-packaging apparatus for fried rice with multiple side dishes in a central kitchen of Embodiment 1 of the present invention.

First, the material box self-resetting module in the model self-construction module in the central control module 304 (as shown in FIG. 1) is started. The material box self-resetting module transmits a signal to the central control module 304, so as to control movement of a position sensor 204 and a main conveyor belt 205, and a material box 201 on the main conveyor belt 205 is reset to completely coincide with a predefined station. Then the fried rice sample A&$H\_1$ is laid in a single-layer and non-overlapping manner in 2 material boxes 201 in other stations before an imaging station 303 (as shown in FIG. 4), and the fried rice sample A-$H\_1$ is laid in a single-layer and non-overlapping manner in 2 material boxes 201 in stations before the imaging station 303 to obtain 2 material boxes 201 containing only thin layers of the fried rice sample A&$H\_1$ and 2 material boxes 201 containing only thin layers of the fried rice sample A-$H\_1$.

Process IV, when a product name of the fried rice to be sub-packaged is "fried rice with ham", a name of the key side dish is "diced ham sausage", station numbers corresponding to the material boxes 201 containing the thin layers of the fried rice sample A&$H\_1$ are "1, and 2", a number of the diced ham sausage $H\_1$ contained in each of the material boxes 201 is "30, and 20", and station numbers corresponding to the material boxes 201 containing the thin layers of the fried rice sample A-$H\_1$ are "3, and 4", station numbers corresponding to an empty material box 201 are "5, and 6" (a station numbering rule is that the loading station is a No. 1 station, and the stations are arranged in clockwise order). The startup model self-construction module in a boundary of the model self-construction module is started, a signal is transmitted to the central control module 304 to control a camera 301 to self-acquire the fried rice samples A&$H\_1$ and A-$H\_1$ and images I_A&$H\_1\_h\_j$, I_A-$H\_1\_h\_j$, and I_O_$h\_j$ of 2 empty material boxes 201 illuminated by 3 light sources with different bands of k1=450 nm, k2=550 nm, and k3=650 nm, and an optimal band $\lambda\_A$ and an optimal segmentation threshold C for key side dish recognition is self-optimized by the central control module 304. An optimal recognition rate for modeling D is self-calculated and displayed. B=3, k1=450 nm, k2=550 nm, k3=650 nm, h∈[1, 3], and j∈[1, 2]. h and b are positive integers.

Process V, when the model recognition rate D is greater than or equal to an expected recognition rate E=95%, the method proceeds to step II of "self-evaluation of the key side dish recognition model". When the model recognition rate D is less than the expected recognition rate E=95%, the processes II, III, IV, and V of the step I are repeated.

A method for predefining the station is as follows. The main conveyor belt 205 is started for 1-60 s of operation, and then a power supply of a drive motor 203 of the main conveyor belt 205 is cut off, such that a certain material box 201 on the surface of the main conveyor belt 205 is directly below the imaging system camera 301, and a position of the main conveyor belt 205 is set at this time as a trigger position of the position sensor 204. Positions of the material boxes 201 on the surface of the main conveyor belt 205 are sequentially numbered from 1 in a movement direction of the main conveyor belt 205 (that is, starting from a loading material box below an unloading port of the hopper 101 and ending with the unloading material box at an end of the main conveyor belt 205), and each of the material boxes corresponds to a station, such that positions of the stations on the main conveyor belt 205 and corresponding numbers of the positions are obtained. A No. 1 station below the unloading port of the hopper 101 is defined as a loading station 106, a station directly under the imaging system camera 301 is defined as the imaging station 303, and the unloading station 107 at the end of the main conveyor belt 205 is defined as the unloading station 107.

After the setting of the trigger position of the position sensor 204 is completed, when each of the material boxes 201 passes directly below the imaging system camera 301, a position trigger can perform triggering once in real time and send a trigger signal once to the central control module 304.

The images I_A&H_1_h_j, I_A-H_1_h_j, and I_O_h_j have pixel gray values in a range of [0 255].

A method for self-optimizing the optimal band $\lambda\_A$ and the optimal segmentation threshold C for key side dish recognition is as follows.

[1] When h=1, images I_A&H_1_1_1 and I_A&H_1_1_2 of 2 fried rice samples A&H_1, images I_A-H_1_1_1 and I_A-H_1_1_2 of 2 fried rice samples A-H_1, and images I_O_1_1 and I_O_1_2 of 2 empty material boxes 201 under a light source of a band $\lambda 1=450$ nm are obtained.

[2] A histogram of the images I_A&H_1_1_1 and I_A&H_1_1_2 is generated to obtain peak gray values K_1_1 and K_1_2 corresponding to a peak value of the histogram, and an average value K_1_mean of K_1_1 and K_1_2 is calculated.

[3] When K_1_mean=150, L=20, and Rand(0, 1)=0.5, a method for determining a downlink optimization step $\Delta K\_1-$ and an uplink optimization step $\Delta K\_1+$ is as follows. The control software obtains a number of optimization thresholds for a downlink optimization method p=Int (L*Rand(0, 1))=10 and q=Int(L*Rand(0, 1))=10 according to a number L=20 of maximum unidirectional thresholds by means of a random number production function Rand(0, 1) and a rounding function Int with a value range in [0 1], and the downlink optimization step $\Delta K\_1-$=Int((K_1_mean)/p)=15 and the uplink optimization step $\Delta K\_1+$=Int((255−(K_1_mean))/q)=10 are calculated accordingly.

[4] Since p=10, q=10, $\Delta K\_1-$=15, $\Delta K\_1+$=10, when c∈[1, p] and d∈[1, q], p downlink optimization thresholds (K_1_mean)−c*$\Delta K\_1-$, q uplink optimization thresholds (K_1_mean)+d*$\Delta K\_1+$, and p*q combined optimization thresholdsC_$\lambda$1_c_d=((K_1_mean)−c*$\Delta K\_1-$, (K_1_mean)+d*$\Delta K\_1+$) are obtained. (K_1_mean)−c*$\Delta K\_1-$ is used as a lower threshold for image processing, and (K_1_mean)+d*$\Delta K\_1+$ is used as an upper threshold for image processing.

[5] For the p*q combined optimization thresholds C_$\lambda$1_c_d=((K_1_mean)−c*$\Delta K\_1-$, (K_1_mean)+d*$\Delta K\_1+$), the central control module 304 sequentially processes the images I_A&H_1_1_1 and I_A&H_1_1_2 of 2 fried rice samples A&H_1, the images I_A-H_1_1_1 and I_A-H_1_1_2 of 2 fried rice samples A-H_1, and the images I_O_1_1 and I_O_1_2 of the 2 empty material boxes 201 according to the optimization threshold C_$\lambda$1_c_d to obtain the recognition number of the key side dishes corresponding to each of the material boxes 201, the recognition number of the key side dishes corresponding to each of the material boxes 201 is compared with the number of the key side dishes input by the workers corresponding to each of the material boxes 201, and a corresponding modeling recognition rate D_$\lambda$1_c_d is calculated.

[6] The value of h is set to 2 and 3 sequentially, and the modeling recognition rates D_$\lambda$2_c_d and D_$\lambda$3_c_d are calculated sequentially according to the above steps. For c∈[1, p] and d∈[1, q], according to a corresponding h value, c value, and d value when a maximum value in all values D_$\lambda$1_c_d, D_$\lambda$2_c_d, and D_$\lambda$3_c_d of the modeling recognition rate D_$\lambda$h_c_d is obtained, the optimal band is determined as $\lambda\_A=\lambda h$, the optimal segmentation threshold is determined as C=C_$\lambda$h_c_d, and the optimal recognition rate for modeling is determined as D=D_$\lambda$h_c_d. If D_$\lambda$1_5_6=98% is the maximum value in D_$\lambda$1_c_d, D_$\lambda$2_c_d, and D_$\lambda$3_c_d, then h=1, c=5, d=6, the corresponding optimal band is $\lambda\_A=11$, the optimal segmentation threshold is C=C_$\lambda$1_5_6=((K_1_mean)−5*$\Delta K\_1-$, (K_1_mean)+6*$\Delta K\_1+$), and the optimal recognition rate for modeling is D=D_$\lambda$h_c_d=98%.

Step II, self-evaluation of the key side dish recognition model includes the following processes.

Process i, when m2=3, the workers take 3 kg of the finished fried rice as a fried rice sample B for model construction, and pick out all the diced ham sausage H_1 in 2 kg of the fried rice sample B to obtain a fried rice sample B&H_1 containing only the diced ham sausage H_1, a fried rice sample B-H_1 without the diced ham sausage H_1, and 1 kg of a fried rice sample B_B containing all ingredients.

Figure 2:
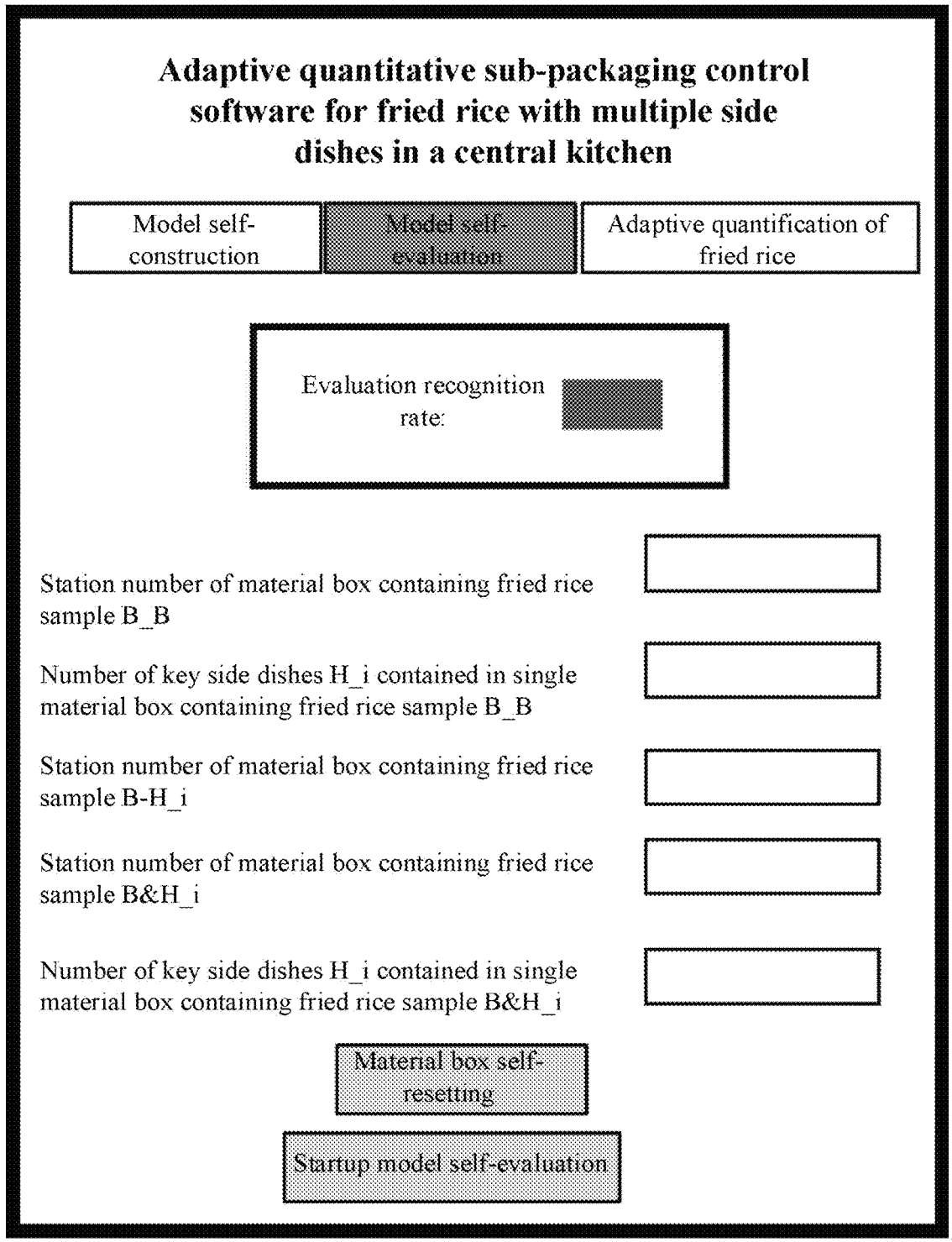
FIG. 2 is a schematic diagram of a model self-evaluation interface of the adaptive quantitative sub-packaging control software for fried rice with multiple side dishes in a central kitchen of Embodiment 1 of the present invention.

Process ii, the material box self-resetting module (as shown in FIG. 2) in the model self-evaluation module in the central control module 304. The material box self-resetting module transmits a signal to the central control module 304 to control the position sensor 204 to reset the material box 201 on the main conveyor belt 205 to completely coincide with the predefined station after one cycle of operation. When w=2, workers lay the fried rice sample B_B in a single-layer and non-overlapping manner on 2 stations before the imaging station 303, lay the fried rice sample B-H_1 in a single-layer and non-overlapping manner on 2 stations before the imaging station 303, and lay the fried rice sample B&H_1 in a single-layer and non-overlapping manner on 2 stations before the imaging station 303 to obtain 2 material boxes 201 containing only thin layers of the fried rice sample B_B, 2 material boxes 201 containing only thin layers of the fried rice sample B-H_1, and 2 material boxes 201 containing only thin layers of the fried rice sample B&H_1.

The main conveyor belt 205 is elliptical, and one circle of operation is recorded as one cycle.

Process iii, when station numbers of the material boxes 201 containing the thin layers of the fried rice sample B_B are "1, and 2", a number of the key side dishes H_i contained in each of the material boxes 201 is "28, and 26", station numbers of the material boxes 201 containing the thin layers of the fried rice sample B-H_1 are "3, and 4", station numbers of the material boxes 201 containing the thin layers of the fried rice sample B&H_1 are "5, and 6", and a number of the key side dishes H_i contained in each of the material boxes 201 is "30, and 30", the workers input, to the model self-evaluation module in the central control module 304, the station numbers "1, and 2" of the material boxes 201 containing the thin layers of the fried rice sample B_B, the number "28, and 26" of the key side dishes H_i contained in each of the material boxes 201, the station numbers "3, and 4" of the material boxes 201 containing the thin layers of the fried rice sample B-H_1, the station numbers "5, and 6" of the material boxes 201 containing the thin layers of the fried rice sample B&H_1, and the number "30, and 30" of the key side dishes H_i contained in each of the material boxes 201.

Process iv, the startup model self-evaluation module in the model self-evaluation module in the central control module 304 is clicked, the startup model self-evaluation module transmits a signal to the central control module 304 to open a light source corresponding to the optimal band $\lambda\_A$ through the central control module 304 according to the optimal band $\lambda\_A$ and the optimal segmentation threshold C obtained in the step I, and the camera 301 acquires images I_B_B_1 and I_B_B_2 of 2 fried rice samples B_B, images I_B-H_1_1 and I_B-H_1_2 of w=2 fried rice samples B-H_1, and images I_B&H_1_1 and I_B&H_1_2 of w=2 fried rice samples B&H_1 illuminated by the light source corresponding to $\lambda\_A$. The central control module 304 sequentially recognizes numbers of the diced ham sausage H_1 in the images I_B_B_1, I_B_B_2, I_B-H_1_1, I_B-H_1_2, I_B&H_1_1, and I_B&H_1_2 according to the optimal segmentation threshold C, and recognition results are compared with numbers of the diced ham sausage H_1 input by the workers to calculate an evaluation recognition rate F.

Process v, when the evaluation recognition rate F is greater than or equal to an expected recognition rate G=95%, control software automatically saves the optimal band $\lambda\_A$ and the optimal segmentation threshold C and the method proceeds to step III of adaptive quantification of the fried rice. When the model recognition rate F is less than the expected recognition rate G=95%, all the processes of the step I are repeated.

Step III, adaptive quantification of batch fried rice sub-packaging includes the following processes.

Figure 3:
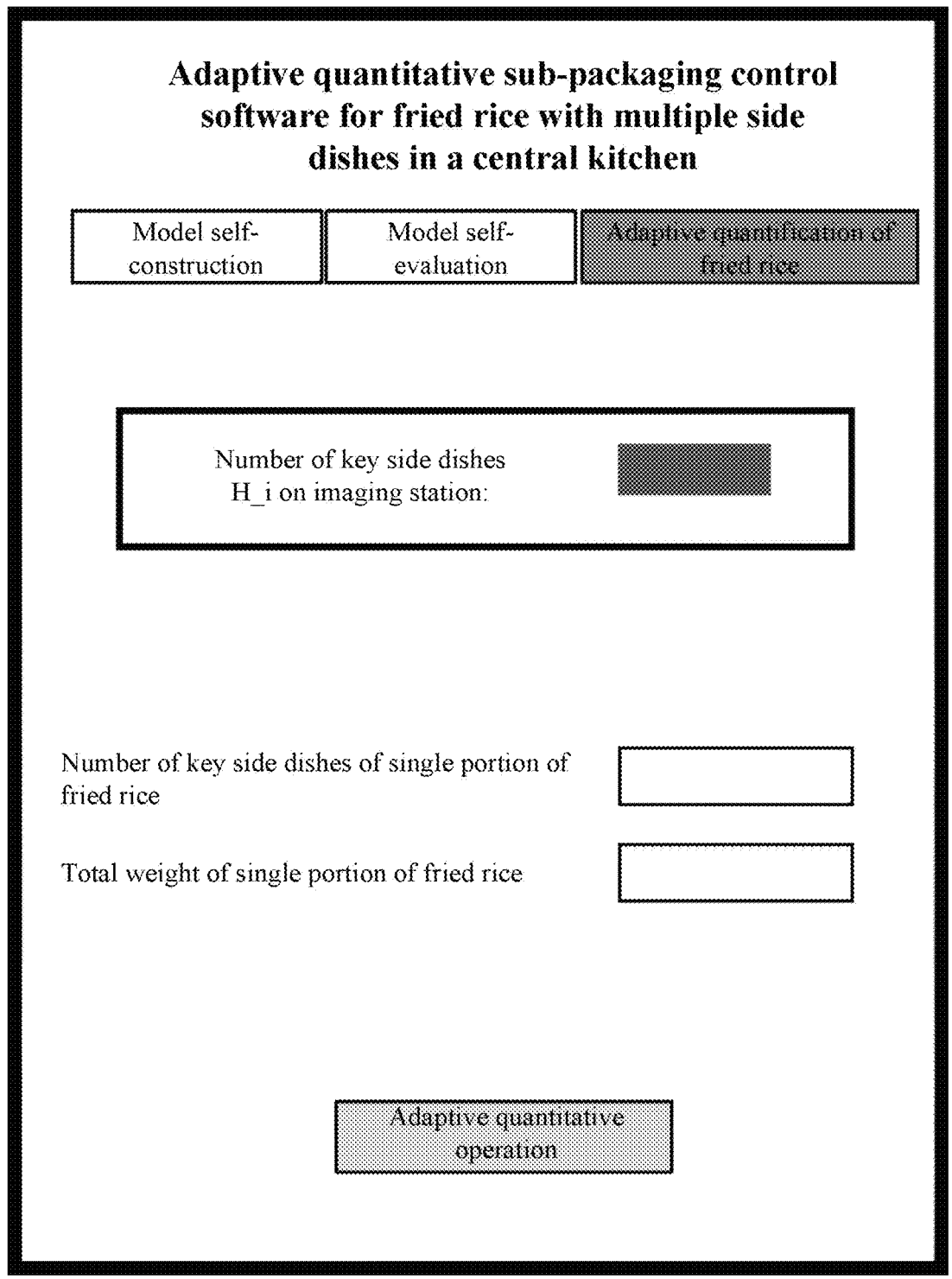
FIG. 3 is a schematic diagram of an adaptive quantitative interface for fried rice of the adaptive quantitative sub-packaging control software for fried rice with multiple side dishes in a central kitchen of Embodiment 1 of the present invention.

Process 1, when I=60 and L=350, batch production is started to obtain the finished fried rice to be sub-packaged according to the standard formula, standard process, and equipment of the process I in the step I, and a number 60 of the key side dish of a single portion of fried rice and a total weight 350 g of a single portion of fried rice are input into the adaptive quantitative module for the fried rice in the central control module 304. The "adaptive quantitative operation" module (as shown in FIG. 3) in the adaptive quantitative module for the fried rice is clicked, and the "adaptive quantitative operation" module transmits a signal to the central control module 304, so as to control a quantitative device to start adaptive quantitative sub-packaging of the finished fried rice to be sub-packaged in a hopper 101.

Process 2, after the quantitative sub-packaging starts, the finished fried rice to be sub-packaged in the hopper 101 falls into the material box 201 on the station corresponding to a surface of the main conveyor belt 205 in a uniform movement state in the form of a single-layer waterfall, rice in a single-layer thin-layer state in the material box 201 passes below the camera 301 when the material box 201 is taken as a basic unit. The central control module 304 senses a movement behavior of the material box 201 on each station through the position sensor 204, and the camera 301 shoots image information of the finished fried rice in the material box corresponding to the imaging station 303 every time the material box 201 moves one station.

Process 3, when f=6 and $\Delta$g=3, the central control module 304 quickly recognizes the product rice in the material box 201 below the camera 301 by using the segmentation threshold C determined in the step I to obtain a number J_c of the diced ham sausage H_1, so as to obtain numbers J-1, J-2, J-3, J-4, J-5, and J-6 of the diced ham sausage H_1 corresponding to the fried rice in the material boxes 201 on f stations to be sub-packaged between the imaging station 303 and an unloading station 107. The central control module 304 loads the fried rice into the same packaging container by taking the fried rice in 2 material boxes 201 as a group according to the numbers J-1, J-2, . . . , J-(f-1), and J-f of the key side dishes in the material box 201 on the f sub-packaging stations to obtain a number 60±3 of the key side dishes of a single portion of fried rice as a target, an optimal matching combination of the key side dishes in any 2 groups of material boxes in all material boxes 201 is determined in an adaptive manner, and matching results are recorded in an array M.

Every time the central control module 304 senses through the position sensor 204 that the material box 201 moves one station, the central control module 304 recognizes the number J_c of the key side dishes newly entering the material box 201 on the imaging station, displays J_c in a text box corresponding to "Number of key side dishes H_i on imaging station" in an interface of "Adaptive quantitative module for fried rice", and updates the array M recording the matching results accordingly.

A method for constructing and defining the array M recording the matching results is as follows. The array M with 3 rows, f+2 columns, and an initial value of 0 for matching of pairwise combinations of the material boxes 201 is established. A 1st column to a (f+2)-th column of the array sequentially corresponds to the imaging station 303 on the sub-packaging equipment, and the f stations to be sub-packaged, and the unloading station 107 for the fried rice, a 1st row of the array M is used to store a number of particles of key side dishes in the material boxes 201 on the stations corresponding to the column of the array, a 2nd row of the array M is used to record and store a falling path of the fried rice in the material boxes 201 on the stations corresponding to the column of the array, a value of a certain column in the 2nd row being 0 indicates that there is no fried rice in the material boxes 201 on the stations corresponding to this column, a value of a certain column in the 2nd row being 1 indicates that the fried rice in the material boxes 201 on the stations corresponding to this column enters a falling path 1, a value of a certain column in the 2nd row being 2 indicates that the fried rice in the material boxes 201 on the stations corresponding to this column enters a falling path 2, a value of a certain column in the 2nd row being 3 indicates that the fried rice in the material boxes 201 on the stations corresponding to this column enters a falling path 3, a 3rd row of the array M is used to store a matching situation of the material boxes 201 on the stations corresponding to the column of the array, matching is performed from the last column of the 3rd row to the first column, values of two certain columns in 3 rows being 1 and 2 respectively and values in the 2nd row of these two columns being both 1 or 2 at the same time indicate that the fried rice in the material boxes 201 on the stations corresponding to these two columns is capable of being matched to one packaging container, and a value of a certain column in 3 rows being 0 indicates that the material boxes 201 on the stations corresponding to this column have not been successfully matched.

The station to be sub-packaged is a station between the imaging station and the unloading station.

A method for updating the array M recording the matching results is as follows. Every time the central control module 304 senses through the position sensor 204 that the material box 201 moves one station, the number J_c of the key side dishes newly entering the material box 201 on the imaging station 303 is obtained by the central control module 304. When f=6, it is assumed that the value of the array M before starting to update is shown in FIG. 5(a), the method for updating the array M according to J_c is as follows.

First, values of the 2nd row and the 3rd row of the (f+2)-th column of the array M to primary quantitative control parameters P1=M(2, f+2) and P2=M(3, f+2). It can be seen from FIG. 5(a) that P1=M(2, f+2)=M(2, 8)=1 and P2=M(3, f+2)=M(3, 8)=1.

Second, the values of k are 2, 3, . . . , f+1, and f+2 sequentially. A value of the array M is moved back by 1 column as a whole through M(:, (f+3)−k)=M(:, (f+2)−k). The number J_c of the key side dishes newly entering the material box 201 on the imaging station is saved into the array, such that M(1, 1)=J_c. When J_c=0, M(2, 1)=M(3, 1)=0 is set. When it is assumed that J_c=32, it can be seen from FIG. 5(a) that the array M is moved back by 1 column as a whole, and a value of the array M obtained after the J_c is saved into the array is shown in FIG. 5(b).

Finally, when it is assumed that J_c=32≠0, the values of k are f+2, f+1, . . . , 3, and 2 sequentially. M(1,k)+M(1,1) is calculated when M(2, k)=3. If the value of k meets matching requirements of I−Δg≤M(1, k)+M(1, 1)≤I+Δg and M(2, 2:k)≠3-Temp, M(2, k)=M(2, 1)=3-Temp, M(3, k)=1, M(3, 1)=2, and Temp=M(2, 1), update of the array M is ended. If there is no value of k meeting matching requirements of I−Δg≤M(1, k)+M(1, 1)≤I+Δg and M(2, 2:k)≠3-Temp, M(2, 1)=3, and M(3, 1)=0, update of the array M is ended. It can be seen from FIG. 5(b) that when k=5, M(2, k)=M(2, 5)=3, at this time M(1, k)=26, M(1, 1)=J_c=32, and after I−Δg≤M (1, k)+M(1, 1)≤I+Δg is substituted, 57≤26+32=58≤63 and M(2, 2:5)≠2, that is, when k=5, the matching requirements are met, M(2, 5)=M(2, 1)=3-Temp=3−1=2 (It can be seen from FIG. 5b that the last successful matching is the combination of the falling path 1, that is, the current value of Temp is 1), M(3, 5)=1, M(3, 1)=2, and Temp=M(2, 1)=2 are set, and update of the array M is ended, as shown in FIG. 5(c).

Process 4, while the array M is being updated, the central control module 304 controls a No. 1 material guide plate 402 and a No. 2 material guide plate 405 according to the primary quantitative control parameters P1 and P2, so as to control a falling track of the fried rice on a slideway, thereby ensuring that the fried rice in the combined material box 201 accurately falls into the packaging container corresponding to a first primary quantitative station 404 or a primary quantitative station 407.

Process 5, in order to ensure that the total weight of the fried rice in the packaging container of the first primary quantitative station 404 or the second primary quantitative station 407 is consistent with the set total weight L of a single portion of fried rice, the fried rice in the packaging container of the first primary quantitative station 404 or the second primary quantitative station 407 is conveyed to a secondary quantitative station 502 along with the packaging container, and the central control module 304 guides counterweight fried rice of a specific weight to fall into a packaging container on the secondary quantitative station 502 according to a weight of the fried rice in the packaging container on the secondary quantitative station 502, such that the total weight of the fried rice in each packaging container after passing through the secondary quantitative station 502 is the same, and the number of the key side dishes in each packaging container is also the same. Then, when the position sensor 204 senses that the next material box 201 enters the imaging station 303, the process 2, process 3, process 4, and process 5 of the step III are repeated.

An initial value of a global variable Temp is 2.

A method for ensuring that the fried rice in the combined material box 201 accurately falls into the primary quantitative station is as follows. The control software reads the values of the primary quantitative control parameters P1 and P2 from the array M to determine the falling path of the fried rice in the material box 201 on the unloading station 107. Since when P1=1 and P2=1, the fried rice enters the falling path 1, the central control module 304 controls the No. 1 material guide plate 402 on a main unloading slideway 401 to be opened upward, and the No. 2 material guide plate 405 to be closed, so as to guide the fried rice in the material box 201 on the unloading station 107 to fall into the packaging container corresponding to the first primary quantitative station 404. Since when P1=1 and P2=2, the fried rice enters the falling path 1, the No. 1 material guide plate 402 on the main unloading slideway 401 is opened upward, and the No. 2 material guide plate 405 is closed, so as to guide the fried rice in the material box 201 on the unloading station 107 to fall into the packaging container corresponding to the first primary quantitative station 404, and a primary quantitative main conveyor belt 409 is controlled to convey the packaging container and the fried rice inside the packaging container to the secondary quantitative station 502, and a packaging container loading mechanism 408 is controlled to convey an empty packaging container to the first primary quantitative station 404 at the same time. Since when P1=2 and P2=1, the fried rice enters the falling path 2, the No. 1 material guide plate 402 on the main unloading slideway 401 is closed, and the No. 2 material guide plate 405 is opened upward, so as to guide the fried rice in the material box 201 on the unloading station 107 to fall into the packaging container corresponding to the second primary quantitative station 407. Since when P1=2 and P2=2, the fried rice enters the falling path 2, the No. 1 material guide plate 402 on the main unloading slideway 401 is closed, and the No. 2 material guide plate 405 is opened upward, so as to guide the fried rice in the material box 201 on the unloading station 107 to fall into the packaging container corresponding to the second primary quantitative station 407, and the primary quantitative main conveyor belt 409 is controlled to convey the packaging container and the fried rice inside the packaging container to the secondary quantitative station 502, and the packaging container loading mechanism 408 is controlled to convey an empty packaging container to the second primary quantitative station 407 at the same time. Since when P1=3, the fried rice enters the falling path 3, the No. 1 material guide plate and the No. 2 material guide plate 405 on the main unloading slideway 401 are both closed, so as to guide the fried rice in the material box 201 on the unloading station 107 to fall into the return hopper 601 through the main unloading slideway 401. Since when P1=0, there is no fried rice in the material box on the unloading station, the No. 1 material guide plate 402 and the No. 2 material guide plate 405 on the main unloading slideway 401 are both closed.

The fried rice in a return hopper 601 is conveyed to the hopper 101 by air flow through a return tube 602.

A method for guiding the counterweight fried rice of a specific weight to fall into the packaging container on the secondary quantitative station 502 is as follows. An electronic scale below the secondary quantitative station 502 senses a total weight M1 of the packaging container above the scale and the fried rice inside in real time, and the central control module 304 starts a secondary quantitative feeding device to work. When L−M1>0, the counterweight fried rice with a weight of L−M1 is conveyed into the packaging container, such that the total weight of the secondary quantitative packaging container and the rice inside the secondary quantitative packaging container is just equal to a set value L. When L−M1=0, the total weight of the fried rice in the packaging container is just equal to the set value L, and no counterweight is required. When L−M1<0, the total weight of the fried rice in the packaging container has exceeded the set value L, and the fried rice is treated as overweight.

The counterweight fried rice does not contain the key side dish H_i, and the rest of the formula, technology, and equipment are all identical to the finished fried rice to be sub-packaged in the process I of the step I.

In the case where the central control module 304 has saved the optimal band λ_A corresponding to the fried rice to be sub-packaged and the optimal segmentation threshold C, the central control module 304 skips the steps I and II, directly calls the saved optimal band λ_A and the optimal segmentation threshold C, and performs step III. If the control software is in capable of calling the optimal band λ_A corresponding to the fried rice to be sub-packaged and the optimal segmentation threshold C, step I, step II, and step III are performed sequentially.

After the setting of the trigger position of the position sensor 204 is completed, when each of the material boxes 201 passes directly below the imaging system camera 301, a position trigger can perform triggering once in real time and send a trigger signal once to the central control module 304.

The present invention provides an apparatus matched with the adaptive quantitative sub-packaging method for the fried rice with the multiple side dishes in the central kitchen, including a fried rice loading device, a fried rice conveying device, a side dish recognition device, a primary quantitative device, a secondary quantitative module, a return device, and the central control module.

A specific structure of the apparatus includes the hopper 101, an electronically controlled discharger 102, a first vibrator 103, a second vibrator 104, a loading guide plate 105, the loading station 106, the unloading station 107, the material box 201, a drive chain 202, the drive motor 203, the position sensor 204, the main conveyor belt 205, the camera 301, the light source 302, the imaging station 303, the central control module 304, a computer 305, the main unloading slideway 401, the No. 1 material guide plate 402, a No. 1 auxiliary slideway 403, the first primary quantitative station 404, the No. 2 material guide plate 405, a No. 2 auxiliary slideway 406, the second primary quantitative station 407, the packaging container loading mechanism 408, the primary quantitative conveyor belt 409, a secondary quantitative conveyor belt 501, the secondary quantitative station 502, a counterweight fried rice hopper 503, a counterweight electronically controlled discharger 504, the electronic scale 505, a third vibrator 506, the return hopper 601, and the return tube 602.

The fried rice loading device is composed of the hopper 101, the electronically controlled discharger 102, the first vibrator 103, the second vibrator 104, and the loading guide plate 105, the electronically controlled discharger 102 is located at the bottom of a discharge port of the hopper 101 and is connected to the first vibrator 103. The loading guide plate 105 is located below the electronically controlled discharger 102, and is connected to the second vibrator 104. The loading guide plate 105 has an inclination angle of 45°, an upper end recorded as an end A, and a lower end recorded as an end B. A lower part of the end B is connected to the material box 201.

The electronically controlled discharger 102, the first vibrator 103, and the second vibrator 104 are all connected to the central control module 304 through a data cable. A working process of the fried rice loading device is as follows. The electronically controlled discharger 102 and the first vibrator 103 convey the rice to be sub-packaged in the hopper 101 to the loading guide plate 105 at a set speed, the loading guide plate 105 cooperates with the second vibrator 104 to work, and the fried rice coming out of the electronically controlled discharger 102 is dispersed and slipped into the corresponding material box 201 on the surface of the main conveyor belt 205 in uniform movement.

The fried rice conveying device is composed of the material box 201, the drive chain 202, the drive motor 203, the position sensor 204, and the main conveyor belt 205. The material boxes have the same size, and are fixed on the main conveyor belt 205 at equal intervals. The position sensors 204 are arranged on both sides of the main conveyor belt 205. When the drive motor 203 and the drive chain 202 drive the material box 201 fixed on the main conveyor belt 205 to move, the position sensor 204 can be triggered once every time the material box 201 moves to a predefined station. The position sensor 204 and the drive motor 203 are both connected to the central control module 304 through a data cable, such that the central control module 304 can accurately sense and control a moving distance and the corresponding position of the material boxes 201.

The side dish recognition device includes the camera 301 and the light source 302, the camera 301 and the light source 302 are arranged directly above the imaging station 303, and are both connected to the central control module 304 through a data cable. The light source 302 is composed of 3 light sources capable of emitting light of multiple different bands (λ1=450 nm, λ2=550 nm, and λ3=650 nm), and the light of a specific band is capable of being individually emitted under the control of the central control module 304. When the material boxes 201 moves to the imaging station 303, the sensor can be triggered. After receiving a trigger signal through the central control module 304, the camera 301 and the light source 302 are controlled to turn on, and an image of fried rice inside the material box 201 corresponding to the imaging station 303 is obtained.

The primary quantitative device includes the main unloading slideway 401 for the fried rice, the No. 1 material guide plate 402, the No. 1 auxiliary slideway 403, the first primary quantitative station 404, the No. 2 material guide plate 405, the No. 2 auxiliary slideway 406, the second primary quantitative station 407, the packaging container loading mechanism 408, and the primary quantitative conveyor belt 409.

The unloading station 107 is arranged at an end of the main conveyor belt 205, and an opening of the main unloading slideway 401 is located below the unloading station 107, such that the fried rice inside the material box falls to an entrance of the main unloading slideway 401 with gravity after the material box 201 reaches the unloading station 107.

The main unloading slideway 401 is inclined, and has an inner wall surface made of a smooth material capable of making the fried rice slide freely.

A lower part of the main unloading slideway 401 is sequentially communicated to the No. 1 auxiliary slideway 403 and the No. 2 auxiliary slideway 406. The No. 1 material guide plate 402 is arranged at a communication place of the main unloading slideway 401 and the No. 1 auxiliary slideway 403. The No. 2 material guide plate 405 is arranged at a communication place of the main unloading slideway 401 and the No. 2 auxiliary slideway 406. The first primary quantitative station 404 is connected to a lower exit of the No. 1 auxiliary slideway 403. The second primary quantitative station 407 is connected to a lower exit of the No. 2 auxiliary slideway 406.

The material guide plate 402 and the material guide plate 405 are used to close and open entrances of the auxiliary slideways, that is, the communication places of the auxiliary slideways and the main unloading slideway 401. When the material guide plate 402 or the material guide plate 405 is opened, the main unloading slideway 401 will be blocked while the entrances of the auxiliary slideway are opened, such that the fried rice can only slide down from the entrances of the auxiliary slideways.

The return hopper 601 is arranged at an end outlet of the main unloading slideway 401. When both the material guide plate 402 and the material guide plate 405 are closed, the fried rice will slide down the main unloading slideway 401 to the return hopper 601.

The No. 1 material guide plate 402, the No. 2 material guide plate 405, the packaging container loading mechanism 408, and the primary quantitative conveyor belt 409 are all electrically connected to the central control module 304 through a data cable.

When the fried rice falls from the material box 201 to the entrance of the main unloading slideway 401, the central control module 304 controls the opening and closing of the No. 1 material guide plate 402 and the No. 2 material guide plate 405, such that the fried rice can fall in 3 different tracks. When the No. 1 material guide plate 402 and the No. 2 material guide plate 405 are both closed, the fried rice enters from the entrance of the main unloading slideway 401 and falls out of the exit of the main unloading slideway 401 into the return device 601. When the No. 1 material guide plate 402 is opened and the No. 2 material guide plate 405 is closed, the fried rice will enter the entrance of the No. 1 auxiliary slideway 403, and fall out of the No. 1 auxiliary slideway 403 into the packaging container of the first primary quantitative station 404. When the No. 1 material guide plate 402 is closed and the No. 2 material guide plate 405 is opened, the fried rice will enter the entrance of the No. 2 auxiliary slideway 406, and fall out of the No. 2 auxiliary slideway 406 into the packaging container of the second primary quantitative station 407. The packaging container loading mechanism 408 can convey the empty packaging container to the first primary quantitative station 404 and the second primary quantitative station 407 under the control of the control module.

The primary quantitative conveyor belt 409 is arranged below the first primary quantitative station 404 and the second primary quantitative station 407. The primary quantitative conveyor belt 409 is electrically connected to the central control module 304.

The primary quantitative conveyor belt 409 is capable of conveying the packaging container with completion of primary quantification to the secondary quantitative module under the control of the central control module 304.

The secondary quantitative module includes the secondary quantitative conveyor belt 501, the secondary quantitative station 502, the counterweight fried rice hopper 503, the counterweight electronically controlled discharger 504, the electronic scale 505, and the third vibrator 506. The secondary quantitative conveyor belt 501 is connected to the primary quantitative conveyor belt 409, and is capable of conveying the packaging container under the control of the central control module 304. The secondary quantitative station 502 is arranged below an outlet of the counterweight electronically controlled discharger 504, and the electronic scale 505 is arranged below the secondary quantitative station 502.

The secondary quantitative conveyor belt 501, the counterweight electronically controlled discharger 504, and the electronic scale 505 are all connected to the central control module 304 through a data cable.

The central control module 304 includes a programmable controller and a power supply, and is electrically connected to the computer 305.

Note: The above embodiments are only used to illustrate the present invention and not to limit the technical solutions described in the present invention. Therefore, although this specification has described the present invention in detail with reference to the above embodiments, those of ordinary skill in the art should understand that the present invention can still be modified or equivalently replaced, and all technical solutions and improvements that do not depart from the spirit and scope of the present invention should be covered within the scope of the claims of the present invention.

What is claimed is:

1. An adaptive quantitative sub-packaging method for fried rice with multiple side dishes in a central kitchen, comprising the following steps:

step I, self-construction of a key side dish recognition model, comprising the following processes:

process I, for fried rice with a standard formula comprising rice, edible oil, m kinds of side dishes, and n kinds of seasoning liquids, obtaining finished fried rice to be sub-packaged by frying with a standardized process and fixed equipment of the central kitchen, and selecting an i-th side dish H_i of the finished fried rice to be sub-packaged as a key side dish required for quantification;

process II, taking m1 kg of the finished fried rice to be sub-packaged as a fried rice sample A for model construction, and separating the key side dish H_i in the fried rice sample A for model construction from other fried rice ingredients to obtain a fried rice sample A&H_i containing only the key side dish H_i, and a fried rice sample A-H_i without the key side dish H_i;

process III, starting a central control module matched with the method, wherein the central control module comprises a model self-construction module, a model self-evaluation module, and an adaptive quantitative module for the fried rice, and the model self-construction module, the model self-evaluation module, and the adaptive quantitative module for the fried rice are electrically connected, and the model self-construction module comprises a material box self-resetting module and a startup model self-construction module, the model self-evaluation module comprises a material box self-resetting module and a startup model self-evaluation module, and the adaptive quantitative module for the fried rice comprises an adaptive quantitative operation module;

first, starting the material box self-resetting module in the model self-construction module in the central control module, transmitting, by the material box self-resetting module, a signal to the central control module, so as to control movement of a position sensor and a main conveyor belt, and resetting a material box on the main conveyor belt to completely coincide with a predefined station; and then laying the fried rice sample A&H_i in a single-layer and non-overlapping manner in w material boxes in other stations before an imaging station, and laying the fried rice sample A-H_i in a single-layer and non-overlapping manner in w material boxes in 5 stations before the imaging station to obtain w material boxes containing only thin layers of the fried rice sample A&H_i and w material boxes containing only thin layers of the fried rice sample A-H_i, wherein a is w positive integer;

process IV, inputting, to the model self-construction module, a product name of the fried rice to be sub-packaged X1, a name of the key side dish X2, a station number corresponding to the material boxes containing the thin layers of the fried rice sample A&H_i and a number of the key side dishes H_i contained in each of the material boxes, and relevant information of a station number corresponding to the material boxes containing the thin layers of the fried rice sample A-H_i; and clicking the startup model self-construction module in a boundary of the model self-construction module, transmitting a signal to the central control module to control a camera to self-acquire the fried rice samples A&H_i and A-H_i and images I_A&H_i_h_j, I_A-H_i_h_j, and I_O_h_j of w empty material boxes illuminated by b light sources with different bands λ1, λ2, ..., λ(b−1), and λb, self-optimizing, by the central control module, an optimal band λ_A and an optimal segmentation threshold C for key side dish recognition, and self-calculating and displaying an optimal recognition rate for modeling of D, wherein h∈[1, b], j∈[1, w], and h and b are positive integers; and process V, when the model recognition rate D is greater than or equal to an expected recognition rate E, proceeding to step II of an operation of "self-evaluation of the key side dish recognition model"; and when the model recognition rate D is less than the expected recognition rate E, repeating the processes II, III, IV, and V of the step I;

step II, self-evaluation of the key side dish recognition model, comprising the following processes:

process i, taking m2 kg of the finished fried rice as a fried rice sample B for model construction, and separating the key side dish H_i in 2*(m2)/3 kg of the fried rice sample B from other fried rice ingredients to obtain a fried rice sample B&H_i containing only a key side dish H_i, a fried rice sample B-H_i without a key side dish H_i, and (m2)/3 kg of a fried rice sample B_B containing all ingredients;

process ii, starting the material box self-resetting module in the model self-evaluation module in the central control module, and transmitting, by the material box self-resetting module, a signal to the central control module to control the position sensor to reset the material box on the main conveyor belt to completely coincide with the predefined station after one cycle of operation; and then laying, by workers, the fried rice sample B_B in a single-layer and non-overlapping manner in w material boxes in the stations before the imaging station, laying the fried rice sample B-H_i in a single-layer and non-overlapping manner in w material boxes in the stations before the imaging station, and laying the fried rice sample B&H_i in a single-layer and non-overlapping manner in w material boxes in the stations before the imaging station to obtain w material boxes containing only thin layers of the fried rice sample B_B, w material boxes containing only thin layers of the fried rice sample B-H_i, and w material boxes containing only thin layers of the fried rice sample B&H_i;

process iii, inputting, to the model self-evaluation module in the central control module, a station number of the material boxes containing the thin layers of the fried rice sample B_B and a number of the key side dishes H_i contained in each of the material boxes, a station number of the material boxes containing the thin layers of the fried rice sample B-H_i, a station number of the material boxes containing the thin layers of the fried rice sample B&H_i, and relevant information of a number of the key side dishes H_i contained in each of the material boxes;

process iv, clicking the startup model self-evaluation module in the model self-evaluation module in the central control module, transmitting, by the startup model self-evaluation module, a signal to the central control module to open a light source corresponding to the optimal band λ_A through the central control module according to the optimal band λ_A and the optimal segmentation threshold C obtained in the step I, and acquiring, by the camera, an image I_B_B_j of w fried rice samples B_B, an image I_B-H_i_j of w fried rice samples B-H_i, and an image I_B&H_i_j of w fried rice samples B&H_i illuminated by the light source corresponding to λ_A; and sequentially recognizing, by the central control module, numbers of the key side dishes H_i in the images I_B_B_j, I_B-H_i_j, and I_B&H_i_j according to the optimal segmentation threshold C, and comparing recognition results with numbers of the key side dishes H_i input by the workers to calculate an evaluation recognition rate F; and process v, when the evaluation recognition rate F is greater than or equal to an expected recognition rate G, automatically saving, by control software, the optimal band λ_A and the optimal segmentation threshold C and proceeding to step III of adaptive quantification of the fried rice; and when the model recognition rate F is less than the expected recognition rate G, repeating all the processes of the step I; and step III, adaptive quantification of batch fried rice sub-packaging, comprising the following processes:

process 1, starting batch production to obtain the finished fried rice to be sub-packaged according to the standard formula, standard process, and equipment of the process I in the step I, and inputting information of a number I of the key side dishes of a single portion of fried rice and a total weight L of a single portion of fried rice into the adaptive quantitative module for the fried rice in the central control module (304); and clicking the "adaptive quantitative operation" module in the adaptive quantitative module for the fried rice, and transmitting, by the "adaptive quantitative operation" module, a signal to the central control module, so as to control a quantitative device to start adaptive quantitative sub-packaging of the finished fried rice to be sub-packaged in a hopper;

process 2, after the quantitative sub-packaging starts, enabling the finished fried rice to be sub-packaged in the hopper to fall into the material box on the station corresponding to a surface of the main conveyor belt in a uniform movement state in the form of a single-layer waterfall, enabling rice in a single-layer thin-layer state in the material box to pass below the camera with the material box as a basic unit, sensing, by the central control module, a movement behavior of the material box on each station through the position sensor, and shooting, by the camera, image information of the finished fried rice in the material box corresponding to the imaging station under the optimal band $\lambda\_A$ every time the material box moves one station;

process 3, quickly recognizing, by the central control module, the product rice in the material box below the camera by using the segmentation threshold C determined in the step I to obtain a number $J\_c$ of the key side dishes $H\_i$, so as to obtain numbers J-1, J-2, ..., J-(f-1), and J-f of the key side dishes $H\_i$ corresponding to the fried rice in the material boxes on f stations to be sub-packaged between the imaging station and an unloading station; loading, by the central control module, the fried rice into the same packaging container by taking the fried rice in 2 material boxes as a group according to the numbers J-1, J-2, ..., J-(f-1), and J-f of the key side dishes in the material box on the f sub-packaging stations to obtain a number I±Δg of the key side dishes of a single portion of fried rice as a target, determining an optimal matching combination of the key side dishes in any 2 groups of material boxes in all material boxes in an adaptive manner, and recording matching results in an array M; and every time the central control module senses through the position sensor that the material box moves one station, recognizing, by the central control module, the number $J\_c$ of the key side dishes newly entering the material box on the imaging station, and updating the array M recording the matching results accordingly, wherein a method for constructing and defining the array M recording the matching results comprises: establishing the array M with 3 rows, f+2 columns, and an initial value of 0 for matching of pairwise combinations of the material boxes, wherein a 1st column to a (f+2)-th column of the array sequentially corresponds to the imaging station on the sub-packaging equipment, and the f stations to be sub-packaged, and the unloading station for the fried rice, a 1st row of the array M is used to store a number of particles of key side dishes in the material boxes on the stations corresponding to the column of the array, a 2nd row of the array M is used to record and store a falling path of the fried rice in the material boxes on the stations corresponding to the column of the array, a value of a certain column in the 2nd row being 0 indicates that there is no fried rice in the material boxes on the stations corresponding to this column, a value of a certain column in the 2nd row being 1 indicates that the fried rice in the material boxes on the stations corresponding to this column enters a falling path 1, a value of a certain column in the 2nd row being 2 indicates that the fried rice in the material boxes on the stations corresponding to this column enters a falling path 2, a value of a certain column in the 2nd row being 3 indicates that the fried rice in the material boxes on the stations corresponding to this column enters a falling path 3, a 3rd row of the array M is used to store a matching situation of the material boxes on the stations corresponding to the column of the array, matching is performed from the last column of the 3rd row to the first column, values of two certain columns in 3 rows being 1 and 2 respectively and values in the 2nd row of these two columns being both 1 or 2 at the same time indicate that the fried rice in the material boxes on the stations corresponding to these two columns is capable of being matched to one packaging container, and a value of a certain column in 3 rows being 0 indicates that the material boxes on the stations corresponding to this column have not been successfully matched, and a method for updating the array M recording the matching results comprises: when the central control module obtains the number $J\_c$ of the key side dishes newly entering the material box on the imaging station, starting to update the array M; first, assigning values of the 2nd row and the 3rd row of the (f+2)-th column of the array M to primary quantitative control parameters P1=M(2, f+2) and P2=M(3, f+2); second, moving a value of the array M back by 1 column as a whole through M(:, (f+3)-k)=M(:, (f+2)-k), wherein values of k are 2, 3, ..., f+1, and f+2 sequentially; saving the number $J\_c$ of the key side dishes newly entering the material box (201) on the imaging station into the array, such that M(1, 1)=J\_c; when J\_c=0, setting M(2, 1)=M(3, 1)=0; finally, when J\_≠0, setting the values of k as f+2, f+1, ..., 3, and 2 sequentially, and calculating M(1, k)+M(1, 1) when M(2, k)=3; if the value of k meets I-Δg≤M(1, k)+M(1, 1)≤I+Δg and M(2, 2:k)≠3-Temp, M(2, k)=M(2, 1)=3-Temp, M(3, k)=1, M(3, 1)=2, and Temp=M(2, 1), ending update of the array M; and if there is no value of k meeting I-Δg≤M(1, k)+M(1, 1)≤I+Δg and M(2, 2:k)≠3-Temp, M(2, 1)=3, and M(3, 1)=0, ending update of the array M;

process 4, while the array M is being updated, controlling, by the central control module, opening and closing of a No. 1 material guide plate and a No. 2 material guide plate according to the primary quantitative control parameters P1 and P2, so as to control a falling track of the fried rice on a slideway, thereby ensuring that the fried rice in the combined material box accurately falls into the packaging container corresponding to a first primary quantitative station or a second primary quantitative station; and process 5, in order to ensure that the total weight of the fried rice in the packaging container of the first primary quantitative station or the second primary quantitative station is consistent with the set total weight L of a single portion of fried rice, conveying the fried rice in the packaging container of the first primary quantitative station or the second primary quantitative station to a secondary quantitative station along with the packaging container, and guiding, by the central control module, counterweight fried rice of a specific weight to fall into a packaging container on the secondary quantitative station according to a weight of the fried rice in the packaging container on the secondary quantitative station, such that the total weight of the fried rice in each packaging container after passing through the secondary quantitative station is the same, and the number of the key side dishes in each packaging container is also the same; and then, when the position sensor senses that the next material box enters the imaging station, repeating the process 2, process 3, process 4, and process 5 of the step III, wherein an initial value of a global variable Temp is 2, and the fried rice in a return hopper is conveyed to the hopper by air flow through a return tube; and in the case where the central control module has saved the optimal band $\lambda\_A$ corresponding to the fried rice to be sub-packaged and the optimal segmentation threshold C, skipping, by the control software, the steps I and II, directly calling the saved optimal band $\lambda\_A$ and the optimal segmentation threshold C, and performing the step III; and if the control software is in capable of calling the optimal band λ_A corresponding to the fried rice to be sub-packaged and the optimal segmentation threshold C, performing the step I, step II, and step III sequentially.

2. The adaptive quantitative sub-packaging method for the fried rice with the multiple side dishes in the central kitchen according to claim 1, wherein the expected recognition rate E in the step I is 95-100%.

3. The adaptive quantitative sub-packaging method for the fried rice with the multiple side dishes in the central kitchen according to claim 1, wherein a method for pre-defining the station in the step I comprises: starting the main conveyor belt for 1-60 s of operation, and then cutting off a power supply of a drive motor of the main conveyor belt, such that a certain material box on the surface of the main conveyor belt is directly below the imaging system camera, and setting a position of the main conveyor belt at this time as a trigger position of the position sensor; sequentially numbering positions of the material boxes on the surface of the main conveyor belt from 1 in a movement direction of the main conveyor belt, that is, starting from a loading material box below an unloading port of the hopper and ending with the unloading material box at an end of the main conveyor belt, wherein each of the material boxes corresponds to a station, such that positions of the stations on the main conveyor belt and corresponding numbers of the positions are obtained, and a No. 1 station below the unloading port of the hopper is defined as a loading station, a station directly under the camera is defined as the imaging station, and the unloading station at the end of the main conveyor belt is defined as the unloading station; and after the setting of the trigger position of the position sensor is completed, when each of the material boxes passes directly below the camera, triggering once, by a position trigger, in real time and sending a trigger signal once to the central control module.

4. The adaptive quantitative sub-packaging method for the fried rice with the multiple side dishes in the central kitchen according to claim 1, wherein the images I_A&H_i_h_j, I_A-H_i_h_j, and I_O_h_j in the step I have pixel gray values in a range of [0 255].

5. The adaptive quantitative sub-packaging method for the fried rice with the multiple side dishes in the central kitchen according to claim 1, wherein a method for self-optimizing the optimal band λ_A and the optimal segmentation threshold C for key side dish recognition in the step I comprises: for images I_A&H_i_h_j of w fried rice samples A&H_i, images I_A-H_i_h_j of w fried rice samples A-H_i, and images I_O_h_j of w empty material boxes under a λh light source of an h-th band, generating a histogram of the images I_A&H_i_h_j respectively to obtain a peak gray value K_h_j corresponding to a peak value of the histogram, and calculating an average value K_h_mean of w peak gray values K_h_j;

according to a downlink optimization step ΔK_h− and an uplink optimization step ΔK_h+ of an h-th band segmentation threshold, determining p downlink optimization thresholds (K_h_mean)−c*ΔK_h− of the segmentation threshold in a downlink optimization direction and q uplink optimization thresholds (K_h_mean)+d*ΔK_h+ in an uplink optimization direction; obtaining p*q combined optimization thresholds C_λh_c_d=((K_h_mean)−c*ΔK_h−, (K_h_mean)+d*ΔK_h+) by taking any one downlink optimization threshold and any one uplink optimization threshold, wherein (K_h_mean)−c*ΔK_h− is used as a lower threshold for image processing, and (K_h_mean)+d*ΔK_h+ is used as an upper threshold for image processing; and sequentially processing, by the central control module, the images I_A&H_i_h_j of w fried rice samples A&H_i, the images I_A-H_i_h_j of w fried rice samples A-H_i, and the images I_O_h_j of the w empty material boxes according to the optimization threshold C_λh_c_d to obtain the recognition number of the key side dishes corresponding to each of the material boxes, comparing the recognition number of the key side dishes corresponding to each of the material boxes with the input number of the key side dishes corresponding to each of the material boxes, and calculating a corresponding modeling recognition rate D_λh_c_d; and calculating the corresponding modeling recognition rate D_λh_c_d sequentially by taking the value of h as 1, 2, ..., b−1, and b sequentially; and according to a corresponding h value, c value, and d value when a maximum modeling recognition rate D_λh_c_d is obtained, determining the optimal band to be λ_A=λh, the optimal segmentation threshold to be C=C_λh_c_d, and the optimal recognition rate for modeling to be D=D_λh_c_d, wherein c∈[1, p], d∈[1, q], and c, d, p, and q are positive integers, and a method for determining the downlink optimization step ΔK_h− and the uplink optimization step ΔK_h+ comprises: obtaining, by the central control module, a number of optimization thresholds for a downlink optimization method p=Int(L*Rand(0, 1)) and q=Int(L*Rand(0, 1)) according to a number L of maximum unidirectional thresholds by means of a random number production function Rand(0, 1) and a rounding function Int with a value range in [0 1], and calculating the downlink optimization step ΔK_h−=Int((K_h_mean)/p) and the uplink optimization step ΔK_h+=Int((255−(K_h_mean))/q) accordingly.

6. The adaptive quantitative sub-packaging method for the fried rice with the multiple side dishes in the central kitchen according to claim 1, wherein in the step II, the main conveyor belt is elliptical, and one circle of operation from a certain starting position back to an origin is recorded as one cycle; and the expected recognition rate G is 95-100%.

7. The adaptive quantitative sub-packaging method for the fried rice with the multiple side dishes in the central kitchen according to claim 1, wherein the station to be sub-packaged in the step III is a station between the imaging station and the unloading station.

8. The adaptive quantitative sub-packaging method for the fried rice with the multiple side dishes in the central kitchen according to claim 1, wherein a method for ensuring that the fried rice in the combined material box accurately falls into the primary quantitative station comprises: since when P1=1 and P2=1, the fried rice enters the falling path 1, controlling, by the central control module, the No. 1 material guide plate on a main unloading slideway to be opened upward, and the No. 2 material guide plate to be closed, so as to guide the fried rice in the material box on the unloading station to fall into the packaging container corresponding to the first primary quantitative station; since when P1=1 and P2=2, the fried rice enters the falling path 1, controlling the No. 1 material guide plate on the main unloading slideway to be opened upward, and the No. 2 material guide plate to be closed, so as to guide the fried rice in the material box on the unloading station to fall into the packaging container corresponding to the first primary quantitative station, and controlling a primary quantitative main conveyor belt to convey the packaging container and the fried rice inside the packaging container to the secondary quantitative station, and controlling a packaging container loading mechanism to convey an empty packaging container to the first primary quantitative station at the same time; since when P1=2 and P2=1, the fried rice enters the falling path 2, controlling the No. 1 material guide plate on the main unloading slideway to be closed, and the No. 2 material guide plate to be opened upward, so as to guide the fried rice in the material box on the unloading station to fall into the packaging container corresponding to the second primary quantitative station; since when P1=2 and P2=2, the fried rice enters the falling path 2, controlling the No. 1 material guide plate on the main unloading slideway to be closed, and the No. 2 material guide plate to be opened upward, so as to guide the fried rice in the material box on the unloading station to fall into the packaging container corresponding to the second primary quantitative station, and controlling the primary quantitative main conveyor belt to convey the packaging container and the fried rice inside the packaging container to the secondary quantitative station, and controlling the packaging container loading mechanism to convey an empty packaging container to the second primary quantitative station at the same time; since when P1=3, the fried rice enters the falling path 3, controlling the No. 1 material guide plate and the No. 2 material guide plate on the main unloading slideway to both be closed, so as to guide the fried rice in the material box on the unloading station to fall into the return hopper through the main unloading slideway; and since when P1=0, there is no fried rice in the material box on the unloading station, controlling the No. 1 material guide plate and the No. 2 material guide plate on the main unloading slideway to both be closed; and a method for guiding the counterweight fried rice of a specific weight to fall into the packaging container on the secondary quantitative station comprises: sensing, by an electronic scale below the secondary quantitative station, a total weight M1 of the packaging container above the scale and the fried rice inside in real time, and starting, by the central control module, a secondary quantitative feeding device to work, wherein when L−M1>0, the counterweight fried rice with a weight of L−M1 is conveyed into the packaging container, such that the total weight of the secondary quantitative packaging container and the rice inside the secondary quantitative packaging container is equal to a set value L; when L−M1=0, the total weight of the fried rice in the packaging container is equal to the set value L, and no counterweight is required; when L−M1<0, the total weight of the fried rice in the packaging container has exceeded the set value L, and the fried rice is treated as overweight; and the counterweight fried rice does not contain the key side dish H_i, and the rest of the formula, technology, and equipment are all identical to the finished fried rice to be sub-packaged in the process I of the step I.

9. An apparatus for implementing the adaptive quantitative sub-packaging method for the fried rice with the multiple side dishes in the central kitchen according to claim 1, comprising a fried rice loading device, a fried rice conveying device, a side dish recognition device, a primary quantitative device, a secondary quantitative device, a return device, and the central control module, wherein a specific structure of the apparatus comprises the hopper, an electronically controlled discharger, a first vibrator, a second vibrator, a loading guide plate, a loading station, the unloading station, the material box, a drive chain, a drive motor, the position sensor, the main conveyor belt, the camera, the light source, the imaging station, the central control module, a computer, a main unloading slideway, the No. 1 material guide plate, a No. 1 auxiliary slideway, the first primary quantitative station, the No. 2 material guide plate, a No. 2 auxiliary slideway, the second primary quantitative station, a packaging container loading mechanism, a primary quantitative conveyor belt, a secondary quantitative conveyor belt, the secondary quantitative station, a counterweight fried rice hopper, a counterweight electronically controlled discharger, an electronic scale, a third vibrator, the return hopper, and the return tube;

the fried rice loading device is composed of the hopper, the electronically controlled discharger, the first vibrator, the second vibrator, and the loading guide plate, the electronically controlled discharger is located at the bottom of a discharge port of the hopper and is connected to the first vibrator; the loading guide plate is located below the electronically controlled discharger, and is connected to the second vibrator; a lower part of the loading guide plate is connected to the material box; and the electronically controlled discharger, the first vibrator, and the second vibrator are all electrically connected to the central control module;

the fried rice conveying device is composed of the material box, the drive chain, the drive motor, the position sensor, and the main conveyor belt, and a plurality of the material boxes are arranged, and are fixed on the main conveyor belt at equal intervals; the position sensors are arranged on both sides of the main conveyor belt to sense and control a moving distance and the corresponding position of the material boxes; and the position sensor and the drive motor are electrically connected to the central control module;

the side dish recognition device comprises the camera and the light source, the camera and the light source are arranged above the imaging station; the imaging station is arranged above the main conveyor belt; the light source is composed of light sources capable of emitting light of multiple different bands, and the light of a specific band is capable of being individually emitted under the control of the central control module; the camera and the light source are both electrically connected to the central control module; and after receiving a trigger signal through the central control module, the camera and the light source are controlled to turn on, and an image of fried rice inside the material box corresponding to the imaging station is obtained;

the primary quantitative device comprises the main unloading slideway for the fried rice, the No. 1 material guide plate, the No. 1 auxiliary slideway, the first primary quantitative station, the No. 2 material guide plate, the No. 2 auxiliary slideway, the second primary quantitative station, the packaging container loading mechanism, and the primary quantitative conveyor belt; the unloading station is arranged at an end of the main conveyor belt, and an opening of the main unloading slideway is located below the unloading station, such that the fried rice inside the material box falls to an entrance of the main unloading slideway with gravity after the material box reaches the unloading station;

a lower part of the main unloading slideway is sequentially communicated to the No. 1 auxiliary slideway and the No. 2 auxiliary slideway; the No. 1 material guide plate is arranged at a communication place of the main unloading slideway and the No. 1 auxiliary slideway; the No. 2 material guide plate is arranged at a communication place of the main unloading slideway and the No. 2 auxiliary slideway; the first primary quantitative station is connected to a lower exit of the No. 1 auxiliary slideway; and the second primary quantitative station is connected to a lower exit of the No. 2 auxiliary slideway;

the No. 1 material guide plate and the No. 2 material guide plate are used to close and open entrances of the auxiliary slideways, that is, the communication places of the auxiliary slideways and the main unloading slideway; and the return hopper is arranged at an end outlet of the main unloading slideway;

the No. 1 material guide plate, the No. 2 material guide plate, the packaging container loading mechanism, and the primary quantitative conveyor belt are all electrically connected to the central control module;

the primary quantitative conveyor belt is arranged below the first primary quantitative station and the second primary quantitative station; and the primary quantitative conveyor belt is electrically connected to the central control module;

the primary quantitative conveyor belt is capable of conveying the packaging container with completion of primary quantitative fried rice to the secondary quantitative device under the control of the central control module;

the secondary quantitative device comprises the secondary quantitative conveyor belt, the secondary quantitative station, the counterweight fried rice hopper, the counterweight electronically controlled discharger, the electronic scale, and the third vibrator; the secondary quantitative conveyor belt is connected to the primary quantitative conveyor belt, and is capable of conveying the packaging container under the control of the central control module; and the secondary quantitative station is arranged below an outlet of the counterweight electronically controlled discharger, and the electronic scale is arranged below the secondary quantitative station;

the secondary quantitative conveyor belt, the counterweight electronically controlled discharger, and the electronic scale are all connected to the central control module through a data cable; and the central control module comprises a programmable controller, and a power supply, and is electrically connected to the computer.

10. The apparatus according to claim 9, wherein the loading guide plate has an inclination angle of 30° to 60°; and the main unloading slideway is inclined, and has an inner wall surface made of a smooth material capable of making the fried rice slide freely.

* * * * *